(12) United States Patent
Sui

(10) Patent No.: US 12,027,045 B2
(45) Date of Patent: *Jul. 2, 2024

(54) NAVIGATION METHOD, DEVICE AND SYSTEM FOR CROSS INTERSECTION

(71) Applicant: Beijing Tusen Zhitu Technology Co., Ltd., Beijing (CN)

(72) Inventor: Qingyu Sui, Beijing (CN)

(73) Assignee: BEIJING TUSEN ZHITU TECHNOLOGY CO., LTD., Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/979,537

(22) Filed: Nov. 2, 2022

(65) Prior Publication Data

US 2023/0065411 A1 Mar. 2, 2023

Related U.S. Application Data

(63) Continuation of application No. 16/586,761, filed on Sep. 27, 2019, now Pat. No. 11,508,238.

(51) Int. Cl.
*G08G 1/01* (2006.01)
*G01C 21/34* (2006.01)
(Continued)

(52) U.S. Cl.
CPC ....... *G08G 1/0145* (2013.01); *G01C 21/3492* (2013.01); *G05D 1/0088* (2013.01);
(Continued)

(58) Field of Classification Search
CPC ...... G08G 1/0145; G08G 1/164; G08G 1/166; G01C 21/3492; G05D 1/0276; G05D 2201/0213; G05D 1/0088
See application file for complete search history.

(56) References Cited

U.S. PATENT DOCUMENTS 6,236,933 B1 * 5/2001 Lang .................... G08G 1/0104
701/119
6,580,997 B2 * 6/2003 MacPhail ............. G08G 1/0104
340/933

(Continued)

FOREIGN PATENT DOCUMENTS

CN 103177596 B 6/2013
CN 103714704 A 4/2014
(Continued)

OTHER PUBLICATIONS

Chinese Application No. 201810870331.9 First Office Action Mailed Feb. 3, 2020, pp. 1-50.
(Continued)

*Primary Examiner* — Luis A Martinez Borrero
(74) *Attorney, Agent, or Firm* — Perkins Coie LLP

(57) ABSTRACT

Embodiments of the present disclosure provide a navigation method, device and system for a cross intersection. The method includes: receiving a message transmitted from a vehicle controller, where the message indicates a request of a vehicle for passing an intersection; and determining whether to allow the vehicle to pass the intersection based on an occupancy condition of the intersection and transmitting an action instruction to the vehicle controller to cause the vehicle controller to control movement of the vehicle.

20 Claims, 10 Drawing Sheets

(51) Int. Cl.
*G05D 1/00* (2024.01)
*G08G 1/16* (2006.01)

(52) U.S. Cl.
CPC .......... *G05D 1/0276* (2013.01); *G08G 1/164* (2013.01); *G08G 1/166* (2013.01)

(56) References Cited

U.S. PATENT DOCUMENTS

| | | | | |
|---|---|---|---|---|
| 6,633,238 | B2* | 10/2003 | Lemelson | G08G 1/0116 340/905 |
| 6,681,175 | B2* | 1/2004 | MacPhail | G08G 1/0104 701/119 |
| 6,781,523 | B2* | 8/2004 | Matsui | G07B 15/063 340/933 |
| 7,864,071 | B2* | 1/2011 | Bachelder | G08G 1/095 340/906 |
| 7,979,198 | B1* | 7/2011 | Kim | G08G 1/091 701/117 |
| 8,116,969 | B2* | 2/2012 | Kolb | G08G 1/20 701/119 |
| 8,736,461 | B2* | 5/2014 | Sharma | G08G 1/08 340/909 |
| 8,825,350 | B1* | 9/2014 | Robinson | G08G 1/042 340/916 |
| 9,114,707 | B2* | 8/2015 | Shida | G08G 1/16 |
| 9,262,915 | B2* | 2/2016 | Clem | G08G 1/08 |
| 9,435,652 | B2* | 9/2016 | Ralston | G08G 1/0145 |
| 9,595,193 | B1* | 3/2017 | Duale | G08G 1/0116 |
| 9,672,743 | B2* | 6/2017 | Hamada | G08G 1/166 |
| 10,037,689 | B2* | 7/2018 | Taylor | G05D 1/0285 |
| 10,074,273 | B2* | 9/2018 | Yokoyama | G08G 1/0112 |
| 10,325,494 | B2 | 6/2019 | Nakajima | |
| 10,363,866 | B2* | 7/2019 | Kline | B60Q 5/005 |
| 10,692,367 | B2* | 6/2020 | Nguyen | G08G 1/0145 |
| 10,867,510 | B2* | 12/2020 | Yang | G05D 1/0246 |
| 10,867,512 | B2* | 12/2020 | Ran | G08G 1/167 |
| 10,909,866 | B2* | 2/2021 | Jacobus | G08G 1/096725 |
| 10,991,242 | B2* | 4/2021 | Taylor | H04Q 9/00 |
| 11,202,302 | B2* | 12/2021 | Cross | G08G 1/087 |
| 11,210,952 | B2* | 12/2021 | Mondragon | G08G 1/16 |
| 11,269,352 | B2* | 3/2022 | Tao | G01C 21/3878 |
| 11,508,238 | B2* | 11/2022 | Sui | G08G 1/164 |
| 2003/0060965 | A1* | 3/2003 | MacPhail | G08G 1/0104 340/907 |
| 2003/0100991 | A1* | 5/2003 | MacPhail | G08G 1/0104 701/422 |
| 2004/0068364 | A1* | 4/2004 | Zhao | G08G 1/096775 455/414.2 |
| 2006/0212561 | A1* | 9/2006 | Feng | G06Q 20/40 709/223 |
| 2013/0116909 | A1* | 5/2013 | Shida | G08G 1/16 701/96 |
| 2014/0278052 | A1* | 9/2014 | Slavin | G01C 21/3492 701/400 |
| 2014/0278070 | A1* | 9/2014 | McGavran | G01C 21/362 701/538 |
| 2014/0335897 | A1* | 11/2014 | Clem | H04W 4/021 455/456.3 |
| 2015/0221222 | A1* | 8/2015 | Hamada | G08G 1/166 701/2 |
| 2016/0027300 | A1* | 1/2016 | Raamot | G08G 1/0145 340/922 |
| 2016/0097648 | A1* | 4/2016 | Hannah | G08G 1/0116 701/118 |
| 2016/0370199 | A1* | 12/2016 | Ralston | G08G 1/0108 |
| 2016/0379486 | A1* | 12/2016 | Taylor | G08G 1/08 340/905 |
| 2017/0053529 | A1* | 2/2017 | Yokoyama | G08G 1/0145 |
| 2017/0234689 | A1* | 8/2017 | Gibson | B60W 60/0015 701/25 |
| 2017/0256167 | A1* | 9/2017 | Kim | G08G 1/096716 |
| 2017/0337813 | A1* | 11/2017 | Taylor | G05D 1/0285 |
| 2017/0345309 | A1* | 11/2017 | Bostick | G05D 1/0289 |
| 2018/0075751 | A1* | 3/2018 | Bostick | G08G 1/166 |
| 2018/0122234 | A1* | 5/2018 | Nascimento | G08G 1/096783 |
| 2018/0180432 | A1* | 6/2018 | Surnilla | G01C 21/3658 |
| 2018/0190111 | A1* | 7/2018 | Green | G08G 1/0133 |
| 2018/0308354 | A1* | 10/2018 | Li | G08G 1/096708 |
| 2019/0033882 | A1* | 1/2019 | Collett | G05D 1/0289 |
| 2019/0088148 | A1* | 3/2019 | Jacobus | H04W 4/38 |
| 2019/0096238 | A1* | 3/2019 | Ran | G08G 1/164 |
| 2019/0130739 | A1* | 5/2019 | Khedkar | G08G 1/0965 |
| 2019/0187723 | A1* | 6/2019 | Tao | G08G 1/0969 |
| 2019/0196500 | A1* | 6/2019 | Harasaki | G05D 1/02 |
| 2019/0206236 | A1* | 7/2019 | Tao | G08G 1/162 |
| 2019/0244518 | A1* | 8/2019 | Cheng | G08G 1/096725 |
| 2019/0244521 | A1* | 8/2019 | Ran | G08G 1/096775 |
| 2019/0251837 | A1* | 8/2019 | Vrabete | G08G 1/0116 |
| 2019/0311614 | A1* | 10/2019 | Yang | G08G 1/052 |
| 2019/0311616 | A1* | 10/2019 | Jin | G05D 1/0297 |
| 2019/0318620 | A1* | 10/2019 | Yang | G05D 1/0027 |
| 2019/0347931 | A1* | 11/2019 | Ding | G08G 1/164 |
| 2019/0385448 | A1* | 12/2019 | Montemurro | G08G 1/0112 |
| 2019/0392712 | A1* | 12/2019 | Ran | G08G 1/0116 |
| 2020/0005633 | A1* | 1/2020 | Jin | G06F 21/6254 |
| 2020/0020234 | A1* | 1/2020 | Cheng | G08G 1/0112 |
| 2020/0021961 | A1* | 1/2020 | Li | H04W 4/46 |
| 2020/0193813 | A1* | 6/2020 | Sui | G08G 1/164 |
| 2020/0242922 | A1* | 7/2020 | Dulberg | G01S 5/06 |
| 2020/0334979 | A1* | 10/2020 | Gonçalves | G08G 1/0129 |
| 2021/0016777 | A1* | 1/2021 | Weiser | G08G 1/096 |
| 2021/0082296 | A1* | 3/2021 | Jacobus | G08G 1/096791 |
| 2021/0082297 | A1* | 3/2021 | Jacobus | H04W 4/38 |
| 2021/0104165 | A1* | 4/2021 | Jacobus | G08G 1/163 |
| 2021/0110726 | A1* | 4/2021 | Jacobus | G05D 1/0257 |
| 2021/0118301 | A1* | 4/2021 | Mondragon | G08G 1/0125 |
| 2021/0201669 | A1* | 7/2021 | Mitra | G08G 1/0116 |
| 2021/0248915 | A1* | 8/2021 | Jacobus | H04W 4/38 |
| 2023/0056023 | A1* | 2/2023 | Ran | G08G 1/0145 |
| 2023/0065411 | A1* | 3/2023 | Sui | G08G 1/0145 |

FOREIGN PATENT DOCUMENTS

| | | |
|---|---|---|
| CN | 104555222 A | 4/2015 |
| CN | 105321362 A | 2/2016 |

OTHER PUBLICATIONS

Chinese Application No. 201810870331.9 Second Office Action Mailed Nov. 4, 2020, pp. 1-49.

Office Action in Chinese Patent Application No. 201810870331.9 dated Mar. 9, 2021.

* cited by examiner

NAVIGATION METHOD, DEVICE AND SYSTEM FOR CROSS INTERSECTION

CROSS-REFERENCE TO RELATED APPLICATION

This patent application claims priority to U.S. patent application Ser. No. 16/586,761 filed Sep. 27, 2019, which claims benefit of priority of Chinese Patent Application No. 201810870331.9, filed Aug. 2, 2018 and entitled "CROSS-ROAD NAVIGATION METHOD, DEVICE AND SYSTEM". The entire content of the before-mentioned patent application is incorporated by reference as part of the disclosure of this application.

TECHNICAL FIELD

Embodiments of the present disclosure relate to intelligent traffic technology, and more particularly, to a navigation method, device and system for a cross intersection.

BACKGROUND

This section is intended to provide a background or context for the embodiments of the present disclosure as set forth in the claims. The description here is not admitted to be prior art by mere inclusion in this section.

It is currently one of the research hotspots in the unmanned driving technology to adjust a moving state of an unmanned vehicle depending on various road conditions to ensure a safe movement. How an unmanned vehicle can pass a cross intersection safely without affecting other vehicles is one of the problems to be solved in this field.

SUMMARY

According to the present disclosure, a navigation method for a cross intersection is provided. The method is applied at an intersection side and includes: receiving a message transmitted from a vehicle controller, wherein the message indicates a request of a vehicle for passing an intersection; and determining whether to allow the vehicle to pass the intersection based on an occupancy condition of the intersection, and transmitting an action instruction to the vehicle controller to cause the vehicle controller to control movement of the vehicle.

According to the present disclosure, a navigation method for a cross intersection is provided. The method is applied at a vehicle side and includes: transmitting to an intersection controller a message indicating a request of a vehicle for passing an intersection; receiving an action instruction transmitted from the intersection controller, when it is determined by the intersection controller that whether to allow the vehicle to pass the intersection based on an occupancy condition of the intersection; and controlling movement of the vehicle based on the action instruction.

According to the present disclosure, an intersection controller is provided. The intersection controller includes a processor, a memory, and a computer program stored on the memory and executable by the processor. The processor is configured to execute the computer program to perform the navigation method for a cross intersection applied at an intersection side according to the present disclosure.

According to the present disclosure, a computer readable storage medium is provided. The computer readable storage medium has a computer program stored thereon. The computer program, when executed by a processor, causes the processor to perform the navigation method for a cross intersection applied at an intersection side according to the present disclosure.

According to the present disclosure, a vehicle controller is provided. The intersection controller includes a processor, a memory, and a computer program stored on the memory and executable by the processor. The processor is configured to execute the computer program to perform the navigation method for a cross intersection applied at a vehicle side according to the present disclosure.

According to the present disclosure, a computer readable storage medium is provided. The computer readable storage medium has a computer program stored thereon. The computer program, when executed by a processor, causes the processor to perform the navigation method for a cross intersection applied at a vehicle side according to the present disclosure.

According to the present disclosure, a vehicle is provided. The vehicle includes the above vehicle controller. The vehicle transmits, via the vehicle controller, to an intersection controller a message indicating a request of a vehicle for passing an intersection. The vehicle receives, via the vehicle controller, an action instruction transmitted from the intersection controller when it is determined by the intersection controller that whether to allow the vehicle to pass the intersection based on an occupancy condition of the intersection. Movement of the vehicle is controlled by the vehicle controller based on the action instruction.

According to the present disclosure, a navigation system for a cross intersection is provided. The navigation system includes a vehicle controller and an intersection controller. The vehicle controller is configured to transmit to the intersection controller a message indicating a request of a vehicle for passing an intersection. The intersection controller is configured to determine whether to allow the vehicle to pass the intersection based on an occupancy condition of the intersection and transmit an action instruction to the vehicle controller. The vehicle controller is further configured to control movement of the vehicle based on the action instruction.

BRIEF DESCRIPTION OF THE DRAWINGS

The above and other objects, features and advantages of the exemplary embodiments of the present disclosure will become more apparent from the following detailed description with reference to the figures. In the figures, a number of embodiments of the present disclosure are shown for illustrating, rather than limiting the present disclosure. In the figures.

In the figures, the same or corresponding reference numerals indicate the same or corresponding parts.

DETAILED DESCRIPTION OF THE EMBODIMENTS

Figure 1:
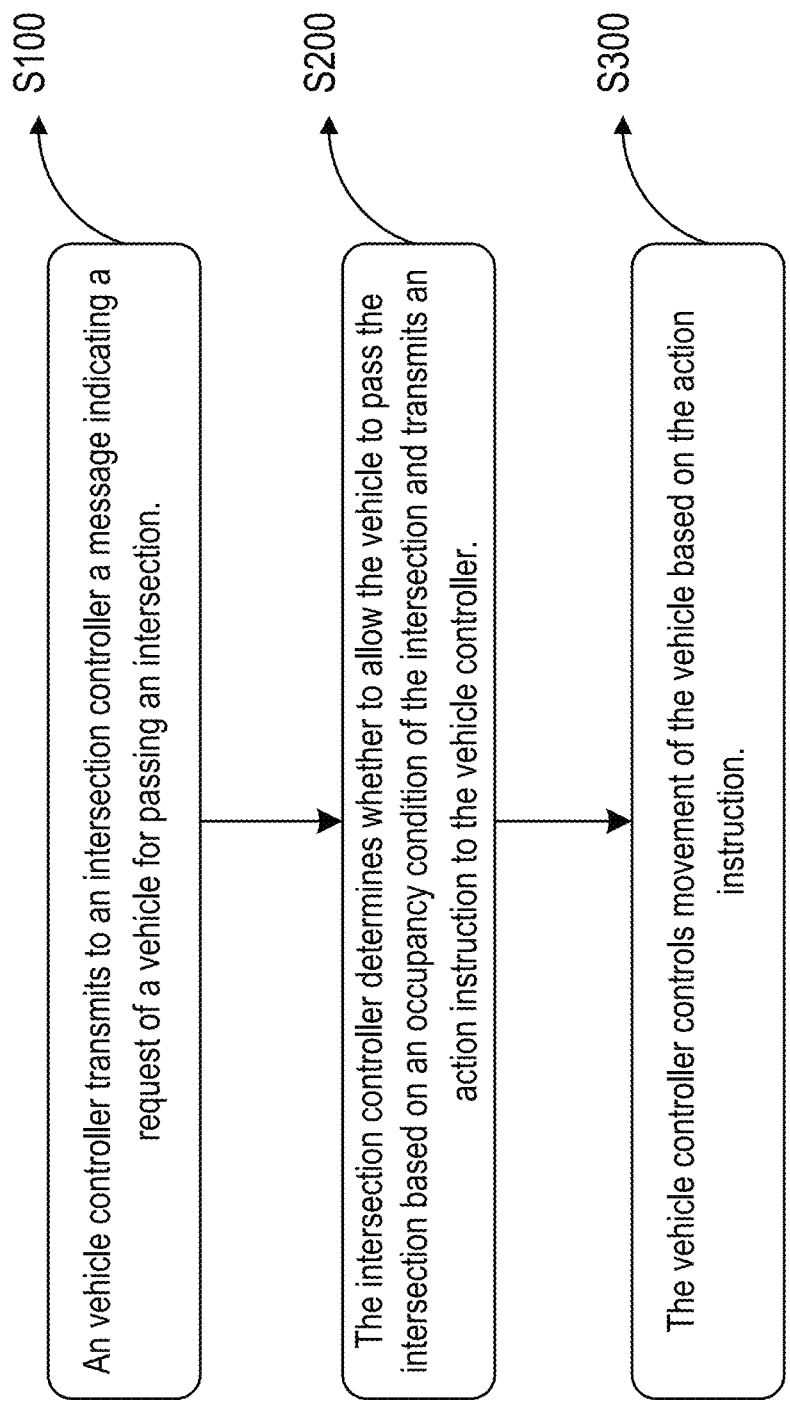
FIG. 1 schematically shows a process flow of a navigation method for a cross intersection according to the present disclosure.

The principles and spirits of the present disclosure will be described below with reference to a number of exemplary embodiments. It is to be understood that the embodiments are presented only to enable those skilled in the art to better understand the present disclosure, instead of limiting the scope of the present disclosure in any way. Rather, these embodiments are provided to make the present disclosure more thorough and complete and to fully convey the scope of the present disclosure to those skilled in the art.

It can be appreciated by those skilled in the art that the embodiments of the present disclosure can be implemented as a system, apparatus, device, method, or computer program product. Accordingly, the present disclosure may be implemented in hardware only, software only (including firmware, resident software, micro codes, etc.), or any combination of hardware and software.

It is to be noted that the terms "cross intersection" and "intersection" as used herein represent an area where two or more roads intersect with each other on one and the same plane. Here, the roads may include, but not limited to city roads, alleys, lanes, or highways. In addition, any number of elements in the figures is used as non-limiting examples and any notation is used for the purpose of distinguishing, rather than limiting.

In the related art, there are several solutions for an unmanned vehicle to pass a cross intersection, as follows.

1. The unmanned vehicle can establish a communication connection with a traffic light (e.g., by means of Vehicle to Everything, or V2X) to obtain an indication signal from the traffic light, so as to determine whether it can pass the cross intersection.

2. The unmanned vehicle can identify an indication signal of a traffic light by using computer vision technology (e.g., by using vehicle-mounted cameras and deep learning algorithms), so as to determine whether it can pass the cross intersection.

3. The unmanned vehicle can predict movement trends of vehicles nearby using perception algorithms (e.g., laser radar or LiDAR perception algorithm), so as to determine whether it can pass the cross intersection.

However, the above solutions have their respective disadvantages. For example, the first solution requires modifications to traffic lights, e.g., by adding communication devices to enable the traffic lights to communicate with unmanned vehicles. The second solution may be vulnerable to environmental impacts. For example, the recognition accuracy of traffic lights may decrease in dark environments. The third solution has a low prediction success rate, especially for large vehicles such as trucks. It is difficult to predict the movement trend of the entire vehicle by perceiving a head and a trailer separately due to different positions and speeds of the head and the trailer.

Unmanned vehicles are expected to having promising applications in fields such as ports or mines. However, most of intersections in closed areas such as ports or mines are not provided with traffic lights, while the first and second solutions above are not suitable to be used at cross intersections without traffic lights.

In the related art, without any traffic light, a vehicle cannot pass an intersection in response to an instruction of a traffic light in accordance with a predefined traffic rule. In this case, for all vehicles that want to pass the intersection in a same time period, the intersection can be regarded as a resource that can be allocated to some of the vehicles. These vehicles can pass the intersection safely without any traffic light, as long as it can be ensured that vehicles occupying the intersection at the same time do not collide with each other and can pass the intersection safely.

According to an embodiment of the present disclosure, a method for controlling movement of a vehicle based on an occupancy condition of an intersection is provided, capable of achieving navigation of the vehicle without any traffic light. With this method, before a vehicle arrives at a cross intersection, a vehicle controller requests the intersection from an intersection controller. The intersection controller analyzes an occupancy condition of the intersection to determine whether to allow the vehicle to pass the intersection, and transmits an action instruction to the vehicle controller. The vehicle controller controls movement of the vehicle based on the action instruction. That is, the vehicle controller controls the vehicle to pass the intersection safely or wait in accordance with the instruction from the intersection controller.

In the following, various non-limiting embodiments of the present disclosure will be explained in detail.

Figure 2:
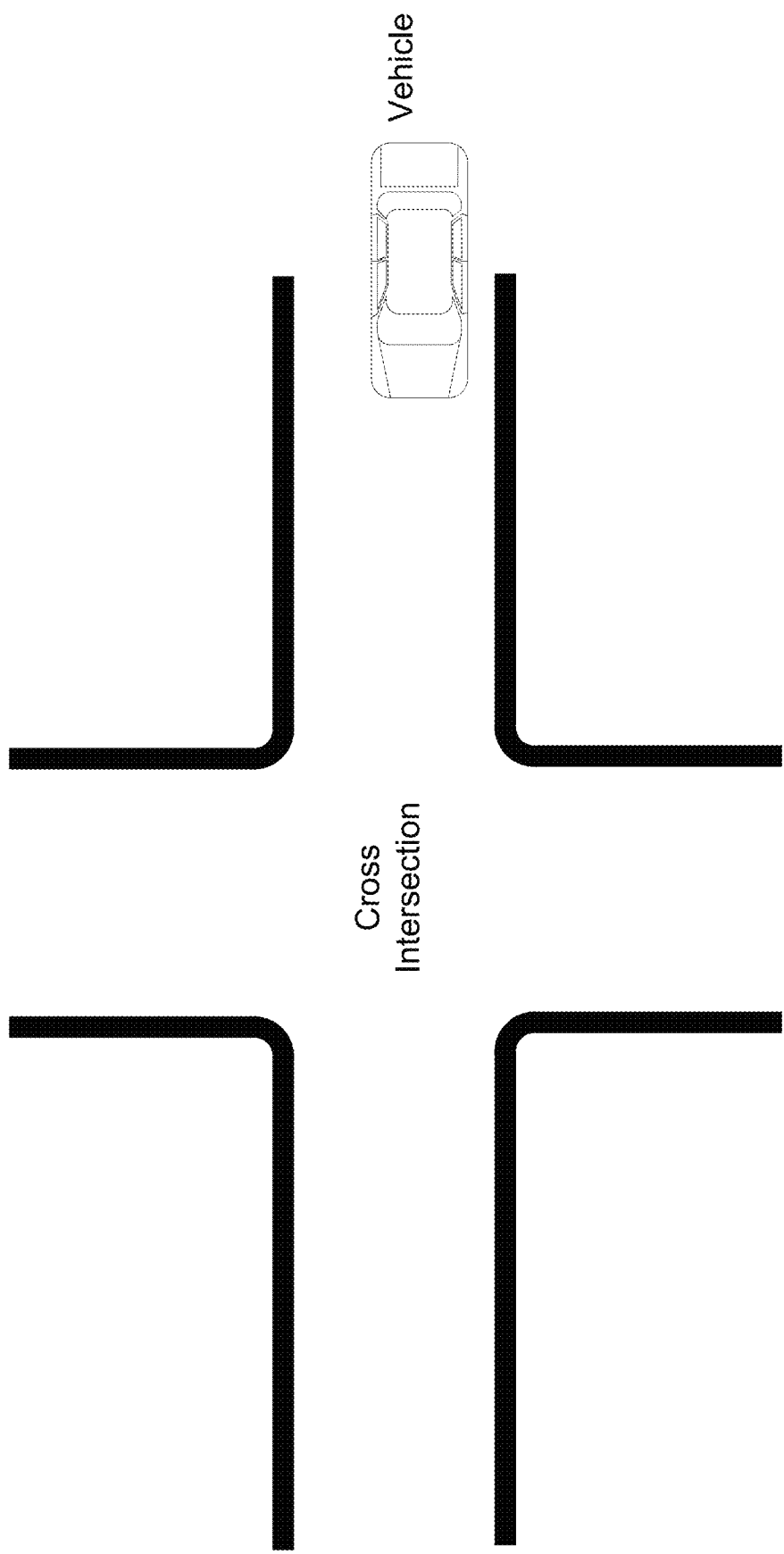
FIG. 2 schematically shows an application scenario of the present disclosure.

FIG. 2 schematically shows an application scenario of the embodiments of the present disclosure. As shown in FIG. 2, a vehicle is moving towards a cross intersection. The navigation method for a cross intersection according to an embodiment of the present disclosure will be described below with reference to FIG. 1, taken in conjunction with the application scenario shown in FIG. 2. It is to be noted that the above application scenario is provided only for facilitating understanding of the spirits and principles of the present disclosure, rather than limiting the embodiments of the present disclosure in any way. The embodiments of the present disclosure can be applied to any appropriate scenario.

FIG. 1 shows a navigation method for a cross intersection according to an embodiment of the present disclosure.

At step S100, a vehicle controller transmits a message indicating a request of a vehicle for passing an intersection.

At step S200, an intersection controller determines whether to allow the vehicle to pass the intersection based on an occupancy condition of the intersection and transmits an action instruction to the vehicle controller.

At step S300, the vehicle controller controls movement of the vehicle based on the action instruction.

Optionally, the intersection controller and the vehicle controller can communicate with each other wirelessly, e.g., via a base station or using V2X or WIFI, and the present disclosure is not limited thereto.

Optionally, the intersection controller can be provided at a specific position, e.g., at the intersection or in a central control room, or may change its position over time, and the present disclosure is not limited thereto.

Optionally, the vehicle can be a legacy vehicle driven by a human, such as a passenger car, a truck, a fire engine or an ambulance, or can be an unmanned vehicle, and the present disclosure is not limited thereto.

Optionally, in the step S100, the vehicle controller can transmit the message indicating the request of the vehicle for passing the intersection to the intersection controller when a distance between the vehicle and the intersection is smaller than or equal to a predetermined distance.

In an embodiment, the vehicle controller can determine the distance between the vehicle and the intersection based on navigation (e.g., GPS navigation) data of an electronic map, and transmit the message indicating the request of the vehicle for passing the intersection to the intersection controller when the distance is smaller than the predetermined distance.

Figure 10:
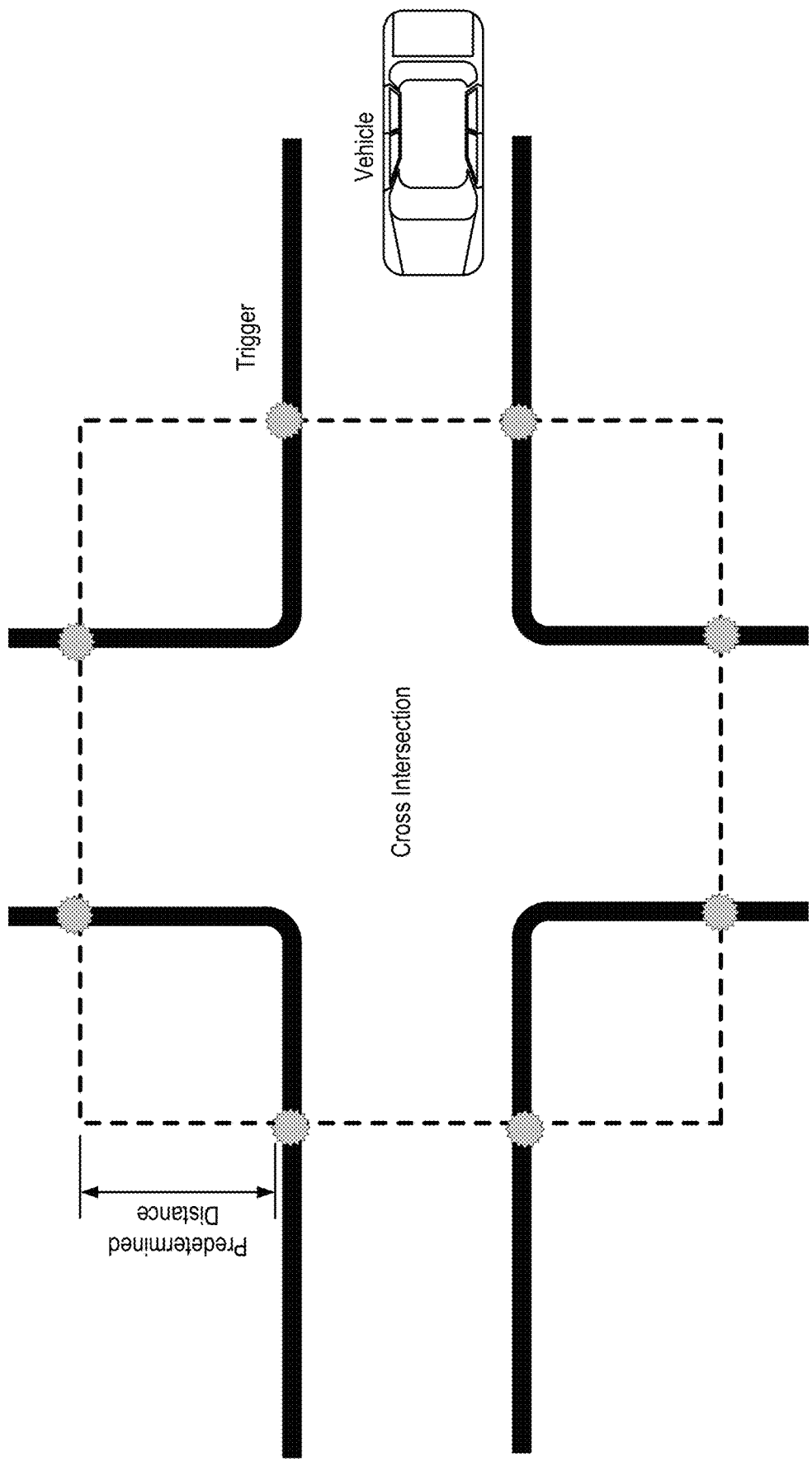
FIG. 10 schematically shows triggers triggering a vehicle controller according to another embodiment of the present disclosure.

In an embodiment, as shown in FIG. 10, a segment of a road that has the predetermined distance from the intersection can be set as an area for a vehicle to request the intersection, e.g., the area shown in dashed lines in FIG. 10. One or more triggers can be provided on two sides of the road at the starting position of the area, i.e., at the position having the predetermined distance from the intersection, and the triggering function can be achieved by communicating with the vehicle controller wirelessly (e.g., using WIFI, V2X, or the like). Triggered by the one or more triggers, the vehicle controller on the vehicle passing the position can start transmitting the message indicating the request of the vehicle for passing the intersection to the intersection controller. For example, the one or more triggers can establish communication with the vehicle controller on the vehicle passing by via a V2X broadcast signal, so as to trigger the vehicle controller to starting transmitting the message indicating the request of the vehicle for passing the intersection.

In practice, the predetermined distance, based on which the vehicle controller starts transmitting the message indicating the request of the vehicle for passing the intersection, may vary depending on the type of the vehicle, the type of the road, whether it is an emergency rescue vehicle, whether it is carrying hazardous chemicals, or the like.

For example, when the type of the vehicle is a large truck having a trailer, its corresponding predetermined distance can be set to be relatively large to allow this type of large truck to start requesting the intersection while it is relatively far from the intersection, such that it is possible for the truck to pass the intersection without deceleration. When the type of the road on which the vehicle is located is a trunk road, its corresponding predetermined distance can be set to be relatively large to allow the vehicle on the trunk road to start requesting the intersection while it is relatively far from the intersection. In this way, when compared with a vehicle having the same distance from the intersection on a branch road, the vehicle on the trunk road can request the intersection earlier, such that when they arrive at the intersection at the same time, the vehicle on the trunk road can use the intersection with a higher priority. When the vehicle is an emergency rescue vehicle, such as a fire engine or an ambulance, its corresponding predetermined distance can be set to be relatively large to allow this type of vehicle to start requesting the intersection while it is relatively far from the intersection, such that it is possible for the vehicle to use the intersection with a higher priority or to pass the intersection without deceleration.

Optionally, in the step S100, the vehicle controller can transmit to the intersection controller the message indicating the request of the vehicle for passing the intersection upon detecting the intersection.

In an embodiment, while the vehicle is moving, the vehicle controller can detect the intersection by using a camera or a laser radar. For example, it can determine whether the intersection is detected by detecting a stop line at the intersection using a camera or a laser radar.

In practice, in order to allow the vehicle to pass the intersection safely, it is required to ensure that vehicles occupying the intersection at the same time do not collide. The key to avoiding collision between vehicles occupying the intersection at the same time is to ensure that their moving directions do not conflict before they enter the intersection. In view of this, in an embodiment of the present disclosure, the intersection controller can determine whether to allow the vehicle to pass the intersection by determining whether a direction in which the vehicle is predetermined move in the intersection (i.e., a predetermined moving direction of the vehicle) conflicts with a moving direction of a vehicle currently occupying the intersection.

Figure 3:
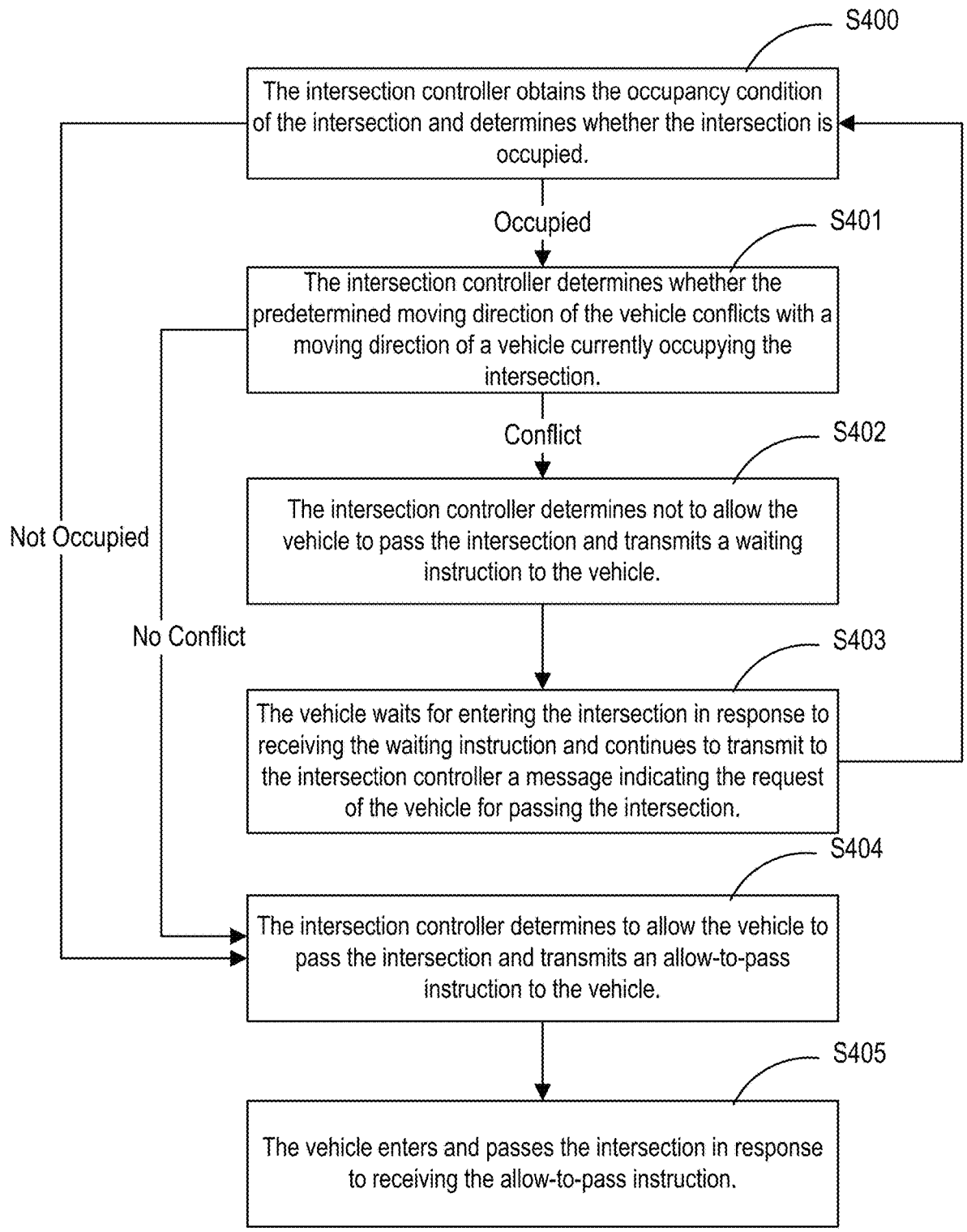
FIG. 3 schematically shows a process flow of a navigation method for a cross intersection according to an embodiment of the present disclosure.

Optionally, the message indicating the request of the vehicle for passing the intersection as transmitted from the vehicle controller to the intersection controller in the step S100 can contain a predetermined moving direction of the vehicle. In this case, as shown in FIG. 3, the steps S200 and S300 can be implemented as follows.

At step S400, the intersection controller obtains the occupancy condition of the intersection and determines whether the intersection is occupied. If so, the method proceeds with step S401; or otherwise the method proceeds with step S404.

At step S401, the intersection controller determines whether the predetermined moving direction of the vehicle conflicts with a moving direction of a vehicle currently occupying the intersection. If so, the method proceeds with step S402; or otherwise the method proceeds with step S403.

At step S402, the intersection controller determines not to allow the vehicle to pass the intersection, and transmits a waiting instruction to the vehicle controller.

At step S403, upon receiving the waiting instruction, the vehicle controller controls the vehicle to wait for entering the intersection, and continues to transmit to the intersection controller a message indicating the request of the vehicle for passing the intersection. The method returns to the step S400 and continues.

At step S404, the intersection controller determines to allow the vehicle to pass the intersection, and transmits an allow-to-pass instruction to the vehicle controller.

At step S405, upon receiving the allow-to-pass instruction, the vehicle controller controls the vehicle to enter and pass the intersection.

With the above steps S400~S405, the intersection controller can determine to allow the vehicle to pass the intersection when determining that the intersection is not occupied or that the intersection is occupied but the predetermined moving direction of the vehicle does not conflict with the moving direction of the vehicle currently occupying the intersection, and transmit the allow-to-pass instruction to the vehicle controller. Upon receiving the allow-to-pass instruction, the vehicle controller can control the vehicle to enter and pass the intersection. The intersection controller can determine not to allow the vehicle to pass the intersection when determining that the intersection is occupied and the predetermined moving direction of the vehicle conflicts with the moving direction of the vehicle currently occupying the intersection, and transmit the waiting instruction to the vehicle controller. Upon receiving the waiting instruction, the vehicle controller can control the vehicle to wait for entering the intersection, and continue to transmit to the intersection controller a message indicating the request of the vehicle for passing the intersection.

Optionally, the intersection can be determined to be occupied in any one of the following three cases.

1) There is a vehicle currently moving in the intersection.

2) There is a vehicle predetermined to enter the intersection. In this case, while there is currently no vehicle moving in the intersection, a vehicle is determined to enter the intersection soon (though it has not arrived at the intersection). For example, an emergency rescue vehicle may start requesting the intersection while it is relatively far from the intersection and have succeeded. After the emergency rescue vehicle has succeeded in requesting the intersection and before it arrives at the intersection, if another vehicle requests the intersection, the intersection will be deemed as occupied.

3) There is a vehicle currently moving in the intersection, and there is a vehicle predetermined to enter the intersection.

Accordingly, the intersection is not occupied when no vehicle is currently moving in the intersection and no vehicle is predetermined to enter the intersection.

Accordingly, the vehicle currently occupying the intersection may include a vehicle currently moving in the intersection and/or a vehicle predetermined to enter the intersection.

It is to be noted that, in an embodiment of the present disclosure, the predetermined moving direction of the vehicle not conflicting with the moving direction of the vehicle currently occupying the intersection means that there will be no conflict point between the movement of the vehicle in its predetermined moving direction and the movement of the vehicle currently occupying the intersection, i.e., there will be no traffic conflict between the vehicles. In an implementation, it can be determined whether there will be a traffic conflict between the vehicles by calculating whether there is an intersection between spaces the vehicles will pass within the intersection while moving in their respective moving directions. There will be no traffic conflict between the vehicles when such intersection does not exist.

Figure 4:
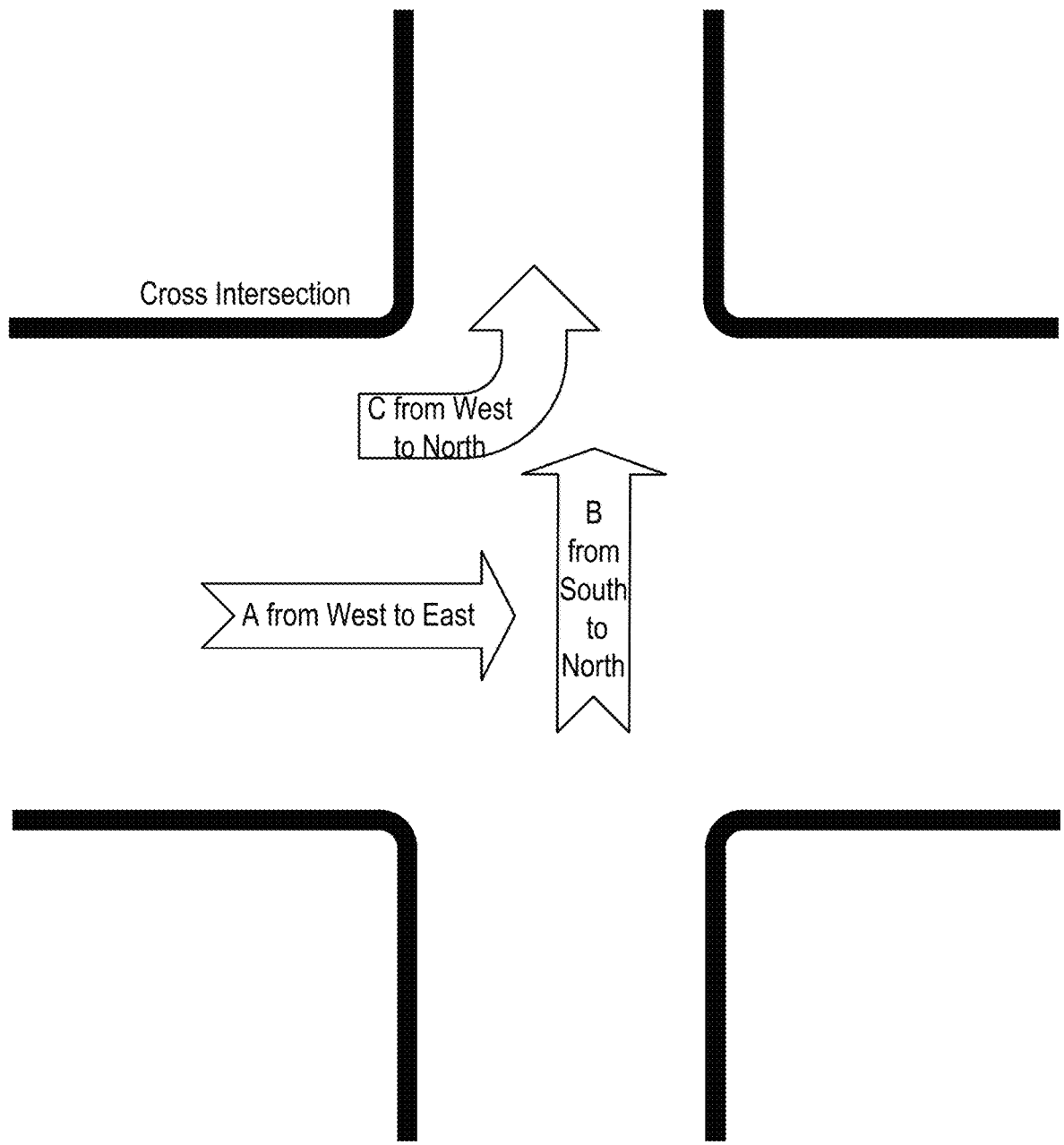
FIG. 4 schematically shows whether moving directions conflict according to another embodiment of the present disclosure.

As shown in FIG. 4, at a cross intersection, Vehicle A moves straight from West to East, Vehicle B moves straight from South to North, and Vehicle C turns left from West to North. In this case, the moving directions of A and B conflict, the moving directions of C and B conflict, and the moving directions of A and C do not conflict.

It is to be noted that, in an embodiment of the present disclosure, the vehicle waiting for entering the intersection means that the vehicle waiting for entering the intersection in a static state while stopping in an area close to the intersection, or in a moving state while continuing to move at its original speed or a reduced speed in an area far from the intersection.

As a conventional driving custom, a vehicle cannot determine whether it is allowed to pass a cross intersection normally, to make a turn or to make a U turn until it gets close to the intersection. If the intersection is under construction, or if no turn or U-turn is allowed at the intersection, the vehicle has to backtrack or take a detour, resulting in a waste of time and energy.

In view of this, in an embodiment, the navigation method for the cross intersection according to the present disclosure may include a step of the intersection controller determining not to allow the vehicle to pass the intersection and notifying the vehicle controller accordingly in response to determining that the intersection is under construction. For example, when determining that the intersection is under construction, the intersection controller can transmit to the vehicle controller a message indicating that the intersection is under construction and thus is not in a passable condition, such that the vehicle can select another road to avoid the intersection.

In another embodiment, the message indicating the request of the vehicle for passing the intersection as transmitted from the vehicle controller to the intersection controller in the step S100 can contain a predetermined moving direction of the vehicle. The navigation method for the cross intersection according to the embodiment of the present disclosure may further include: the intersection controller determining not to allow the vehicle to pass the intersection and notifying the vehicle accordingly, when determining that the predetermined moving direction of the vehicle violates a traffic rule for the intersection. For example, when the predetermined moving direction of the vehicle can be a left turn at the intersection, which happens to be prohibited for the intersection, the intersection controller can transmit to the vehicle a message indicating that no left turn is allowed, such that the vehicle can select to avoid the intersection, or to change its moving direction and then transmit a further message indicating the request of the vehicle for passing the intersection to the intersection controller.

In practice, the number of vehicles that can move in the intersection may depend directly on the size of the area of the intersection. In order to fully ensure the vehicles to pass the intersection safely, the intersection can be set to allow only a predetermined number of vehicles to occupy the intersection at the same time period. For example, for an intersection having a small area, it can be set to allow only one vehicle to occupy the intersection at one time. In an embodiment, the steps S200 and S300 may be implemented as follows. The intersection controller can determine not to allow the vehicle to pass the intersection when determining that there are a predetermined number of vehicles currently occupying the intersection, and transmit the waiting instruction to the vehicle controller. The vehicle controller can control the vehicle to wait for entering the intersection in accordance with the waiting instruction, and continue to transmit to the intersection controller a message indicating the request of the vehicle for passing the intersection.

In practice, when a particular type of vehicle, such as a heavy container truck or a vehicle carrying hazardous chemicals, is in an intersection, it may not be appropriate for other vehicles to enter the intersection for safety reasons. For example, when a heavy container truck is currently moving in the intersection, it is likely to collide with other vehicles that are also in the intersection due to different speeds and positions of its head and trailer. In another example, when a vehicle carrying hazardous chemicals is currently moving in the intersection, any accident would be severely hazardous to other vehicles that are also in the intersection. In view of this, when such type of vehicle is currently occupying the intersection, other vehicles may not be allowed to pass the intersection temporarily. Moreover, when such type of vehicle requests to pass the intersection while the intersection is currently occupied by another vehicle, such type of vehicle may not be allowed to pass the intersection temporarily. In an embodiment, the message indicating the request of the vehicle for passing the intersection as transmitted from the vehicle controller to the intersection controller in the step S100 can further contain a type of the vehicle. In this case, the steps S200 and S300 may be implemented as follows. The intersection controller can determine not to allow the vehicle to pass the intersection when determining that the vehicle currently occupying the intersection belongs to a predetermined type or that the intersection is occupied and the vehicle belongs to a predetermined type, and transmit the waiting instruction to the vehicle controller. The vehicle controller can control the vehicle to wait for entering the intersection in accordance with the waiting instruction, and continue to transmit to the intersection controller a message indicating the request of the vehicle for passing the intersection. Here, vehicles can be divided into different types depending on their models and/or purposes. For example, the types of vehicles may include passenger cars, heavy container trucks, emergency rescue vehicles, vehicles carrying hazardous chemicals, and the like.

Optionally, the occupancy condition of the intersection can be recorded as follows. The intersection controller can create an occupancy list for the intersection, and write an identifier and the predetermined moving direction of the vehicle into the occupancy list when determining to allow the vehicle to pass the intersection. The intersection controller can remove the identifier and the predetermined moving direction of the vehicle from the occupancy list associated with the intersection when determining that the vehicle has passed and left the intersection. The intersection controller can determine the occupancy condition of the intersection based on the occupancy list.

Here, the message indicating the request of the vehicle for passing the intersection as transmitted from the vehicle controller to the intersection controller may carry the identifier and the predetermined moving direction of the vehicle. The identifier of the vehicle may include, but not limited to, a license plate number.

Optionally, the intersection controller can determine that the vehicle has passed and left the intersection as follows. The vehicle controller can transmit to the intersection controller a message indicating that the vehicle has passed the intersection when the vehicle has passed and left the intersection. For example, a dedicated pile can be provided at a junction of the intersection and the road. The vehicle controller can determine that the vehicle has passed the intersection in response to detecting the dedicated pile and determining that the vehicle is moving toward a direction away from the intersection. Alternatively, the intersection controller can obtain position data (e.g., GPS data) of the vehicle in real time and determine whether the vehicle has passed and left the intersection by comparing the position data of the vehicle with position data of the intersection. In practice, for a vehicle having a long vehicle body, such as a heavy container truck, it is required to determine whether the entire vehicle body has completely left the intersection so as to determine whether the vehicle has passed the intersection. In this case, a sensor can be provided at the back of the vehicle for detecting the dedicated pile, or alternatively the position data of the back of the vehicle can be compared with the position data of the intersection.

In practice, there may usually be cases where a plurality of vehicles request to pass the intersection at the same time. In this case, the intersection controller can determine an order of the vehicles based on attribute information of the vehicles (e.g., types of the vehicles or types of roads on which the vehicles are located), so as to allow the vehicles to pass the intersection in the order. Here, vehicles can be divided into different types depending on their models and/or purposes. For example, the types of vehicles may include passenger cars, heavy container trucks, emergency rescue vehicles, vehicles carrying hazardous chemicals, and the like.

Optionally, the message indicating the request of the vehicle for passing the intersection as transmitted from the vehicle controller to the intersection controller in the step S100 can contain attribute information of the vehicle, such as the type of the vehicle or the type of road on which the vehicle is located. In this case, the navigation method for the cross intersection according to an embodiment of the present disclosure may further include: the intersection controller determining, when receiving messages indicating respective requests of a plurality of vehicles for passing the intersection, a priority order for the plurality of vehicles based on the attribute information of each of the plurality of vehicles, as an order in which the plurality of vehicles are to pass the intersection.

In an embodiment, the intersection controller can determine the priority orders for the vehicles requesting the intersection simultaneously in accordance with a rule that descending priority orders are to be given to emergency rescue vehicles, vehicles carrying hazardous chemicals, vehicles on trunk roads, vehicles on branch roads, passenger cars, and trucks. For example, among the vehicles requesting the intersection simultaneously, if there is an emergency rescue vehicle, it can be determined that the emergency rescue vehicle can pass the intersection with the highest priority; if there are ordinary vehicles and a vehicle carrying hazardous chemicals, the vehicle carrying hazardous chemicals can pass the intersection with a higher priority, so as to shorten the time period during which such vehicle is staying in the intersection, thereby guaranteeing the safety of the ordinary vehicles; if there are vehicles on a trunk road and vehicles on a branch road, the vehicles on the trunk road can pass the intersection with a higher priority; or if there are passenger cars and trucks requesting the intersection at the same time on the trunk road (or the branch road), the passenger cars can pass the intersection with a higher priority.

However, in processing the requests of vehicles for passing the intersection sequentially according to the above priority order, there may be an abnormal situation in which. For two vehicles in the same lane, a vehicle may be closer to an intersection and thus supposed to enter the intersection earlier than another vehicle but may have a lower priority than the other vehicle. In this case, the vehicle with the higher priority and farther from the intersection cannot enter the intersection before the vehicle closer to the intersection. In order to solve this abnormal situation, optionally, according to an embodiment of the present disclosure, the navigation method for the cross intersection can further include: when the intersection controller determining that a vehicle having a higher priority in the priority order and a vehicle having a lower priority in the priority order are in a same lane and the vehicle having the higher priority has to enter the intersection after the vehicle having the lower priority, the intersection controller ranking the vehicle having the lower priority with a higher priority than the vehicle having the higher priority.

For example, when a passenger car and an emergency rescue vehicle in the same lane request an intersection at the same time, the passenger car is closer to the intersection and the intersection controller has assigned a higher priority to the emergency rescue vehicle in the priority order based on the attribute information of the vehicles. In this case, the intersection controller may determine that the emergency rescue vehicle has to enter the intersection after the passenger car based on the position data (e.g., GPS data) of the passenger car and the emergency rescue vehicle, and thus swap the priority of the passenger car with the priority of the emergency rescue vehicle in the priority order, such that the passenger car can pass the intersection before the emergency rescue vehicle.

In practice, when determining that the vehicle has been waiting for entering the intersection for a time period longer than a predetermined time length, the intersection controller may assign the vehicle with a higher priority in the priority order, such that the vehicle can pass the intersection earlier.

Figure 9:
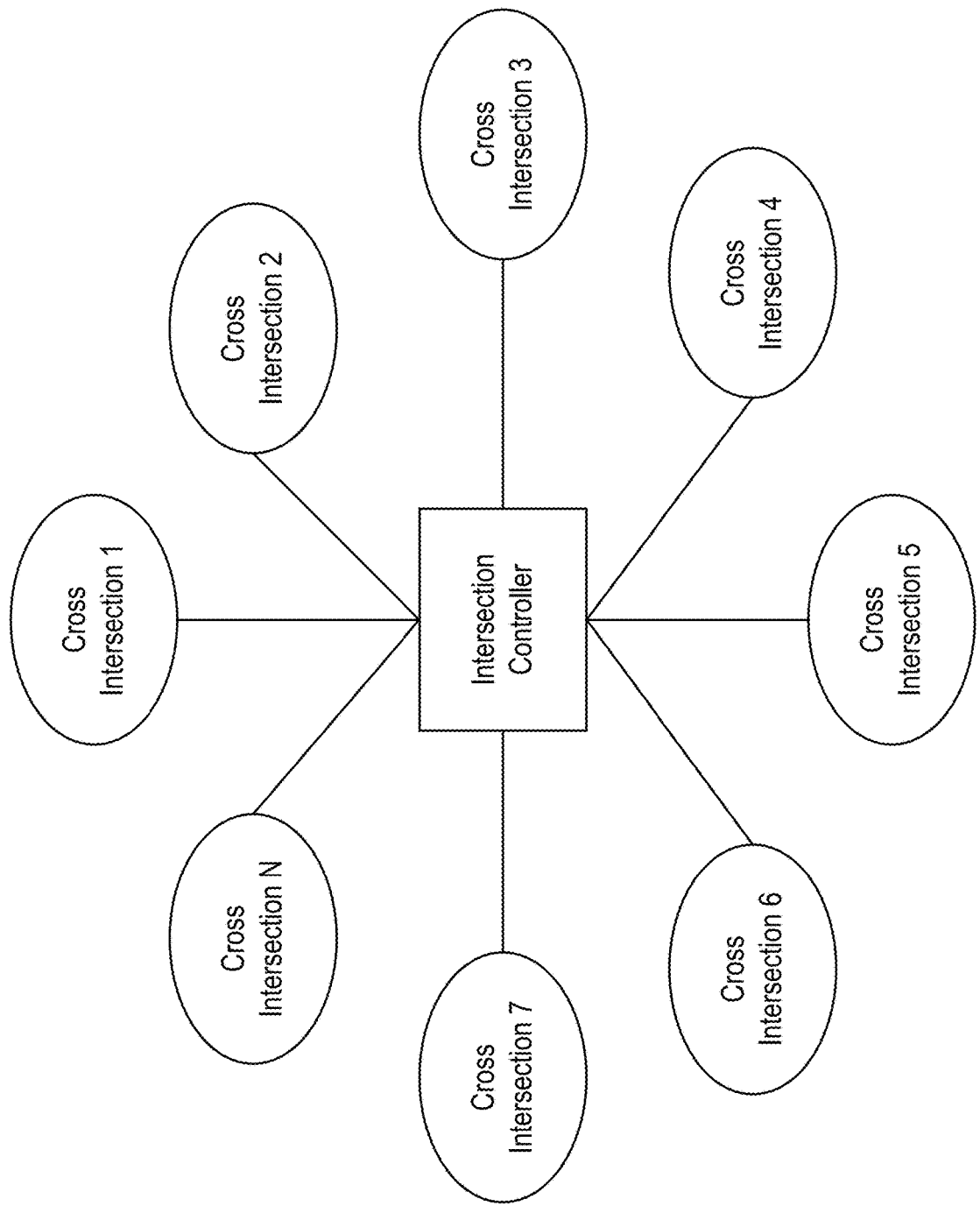
FIG. 9 schematically shows an intersection controller simultaneously controlling vehicles to pass a plurality of intersections according to another embodiment of the present disclosure.

Unlike conventional navigation schemes based on traffic lights, which rely on devices fixed at the intersection, the navigation method for the cross intersection according to the embodiment of the present disclosure is implemented based on a communication network. Thus, there is no requirement on spatial arrangement for an apparatus performing the method. Rather, the method can be implemented as long as a stable communication network can be guaranteed. With this advantage, as shown in FIG. 9, in an implementation scenario of the present disclosure, one intersection controller can handle vehicle passage tasks for a plurality of intersections simultaneously. Optionally, the message indicating the request of the vehicle for passing the intersection as transmitted from the vehicle controller to the intersection controller in the step S100 can contain an identifier of the intersection. The intersection controller can determine the intersection requested by the vehicle based on the identifier of the intersection, obtain the occupancy condition of the intersection, and handle the task for determining whether to allow the vehicle to pass the intersection.

In practice, with one intersection controller handling vehicle passage tasks for a plurality of intersections, it is possible not only to improve resource utilization, but also to facilitate implementation of intelligent traffic management. In particular, for some relatively closed areas, such as highway ports, coastal ports, mining areas, airports, goods distribution centers, or the like, the vehicle movement condition within such areas can be effectively equalized, so as to reduce traffic congestion rate.

For example, in an embodiment, the intersection controller can determine the next intersection in the moving direction of the vehicle based on the predetermined moving direction of the vehicle. When monitoring that the occupancy condition of the next intersection has reached a congested state, the intersection controller can determine not to allow the vehicle to pass the intersection and transmit a waiting instruction to the vehicle controller, so as not to deteriorate the congestion condition of the next intersection.

In another embodiment, the message indicating the request of the vehicle for passing the intersection as transmitted from the vehicle controller to the intersection controller in the step S100 can contain destination information of the vehicle. The intersection controller can monitor an occupancy condition of each of a plurality of intersections within a closed area, analyze a congestion condition for each intersection, and plan a more reasonable route for the vehicle based on the destination of the vehicle.

In practice, for some relatively closed areas (such as ports), their capacities for vehicles may be limited and thus the requirements on the computation capabilities of the intersection controller may be relatively low. In this case, it is sufficient if the intersection controller adopts serial computation. However, for some relatively open areas (such as cities), their capacities for vehicles may be high, the number of tasks associated with requests of vehicles for intersections to be handled simultaneously may be very large, and thus the requirements on the computation capabilities of the intersection controller may be higher. In this case, the intersection controller may adopt parallel computation to meet the requirements on the computation capabilities.

Example 1

Referring to Table 1 and Table 2, in this embodiment, an intersection controller T controls passage at a cross intersection X. A vehicle controller mounted on a vehicle V1 transmits to the intersection controller T a message indicating a request of the vehicle for passing the intersection upon detecting the cross intersection X. The message indicates a predetermined moving direction of the vehicle V1 as from West to East. The intersection controller T retrieves an occupation list for the cross intersection X and determines that the occupation list is currently empty, i.e., no vehicle is currently occupying the intersection. Thus, the intersection controller T determines to allow the vehicle V1 to pass, and transmits an allow-to-pass instruction. Upon receiving the instruction, the vehicle controller controls the vehicle V1 to enter and pass the cross intersection X.

TABLE 1

| Message Indicating Request of Vehicle for Passing Intersection ||
|---|---|
| Vehicle | Moving Direction |
| V1 | From West to East |

TABLE 2

| Occupation List ||
|---|---|
| Vehicle | Moving Direction |
| Null | Null |

Example 2

Referring to Table 3 and Table 4, in this embodiment, an intersection controller T controls passage at a cross intersection X. A vehicle controller mounted on a vehicle V1 transmits to the intersection controller T a message indicating a request of the vehicle for passing the intersection upon detecting the cross intersection X. The message indicates a predetermined moving direction of the vehicle V1 as from West to East. The intersection controller T retrieves an occupation list for the cross intersection X, which contains a record of a vehicle V2 and its moving direction from West to East. As the moving directions of the vehicles V1 and V2 do not conflict, the intersection controller T determines to allow the vehicle V1 to pass, and transmits an allow-to-pass instruction. Upon receiving the instruction, the vehicle controller controls the vehicle V1 to enter and pass the cross intersection X.

TABLE 3

Message Indicating Request of Vehicle for Passing Intersection

| Vehicle | Moving Direction |
|---------|------------------|
| V1      | From West to East |

TABLE 4

Occupation List

| Vehicle | Moving Direction |
|---------|------------------|
| V2      | From West to East |

Example 3

Referring to Table 5 and Table 6, in this embodiment, an intersection controller T controls passage at a cross intersection X. When a vehicle V1 passes one or more triggers provided at two sides of a road and having a distance of 500 meters from the cross intersection X, the one or more triggers trigger a vehicle controller mounted on the vehicle V1 to transmit to the intersection controller T a message indicating a request of the vehicle for passing the intersection. The message indicates a predetermined moving direction of the vehicle V1 as from West to East. The intersection controller T retrieves an occupation list for the cross intersection X, which contains a record of a vehicle V2 and its moving direction from South to North.

The intersection controller T determines that the moving directions of the vehicles V1 and V2 conflict, determines not to allow the vehicle V1 to pass, and transmits a waiting instruction to the vehicle controller of the vehicle V1. Upon receiving the instruction, the vehicle controller of the vehicle V1 controls the vehicle V1 to wait for entering the cross intersection X and continues to transmit a message indicating the request of the vehicle for passing the intersection.

After the vehicle V2 has left the cross intersection X, the intersection controller T removes the information of the vehicle V2 from the occupation list, such that the occupation list becomes empty. In this case, the intersection controller T determines to allow the vehicle V1 to pass, and transmits an allow-to-pass instruction to the vehicle controller of the vehicle V1. Upon receiving the instruction, the vehicle controller of the vehicle V1 controls the vehicle V1 to enter and pass the cross intersection X.

TABLE 5

Message Indicating Request of Vehicle for Passing Intersection

| Vehicle | Moving Direction |
|---------|------------------|
| V1      | From West to East |

TABLE 6

Occupation List

| Vehicle | Moving Direction |
|---------|------------------|
| V2      | From South to North |

Example 4

Referring to Table 7 and Table 8, in this embodiment, an intersection controller T controls passage at a cross intersection X. When a vehicle V1 passes one or more triggers provided at two sides of a road and having a distance of 500 meters from the cross intersection X, the one or more triggers trigger a vehicle controller mounted on the vehicle V1 to transmit to the intersection controller T a message indicating a request of the vehicle for passing the intersection. The message indicates a predetermined moving direction of the vehicle V1 as from West to East. The intersection controller T retrieves an occupation list for the cross intersection X, which contains a record of a vehicle V2 and its moving direction from West to East and a record of a vehicle V3 and its moving direction from West to East.

The intersection controller T determines that the moving directions of the vehicles V1 and V2 do not conflict and the moving directions of the vehicles V1 and V3 do not conflict, but the cross intersection X can only be occupied by up to two vehicles at the same time. Thus, the intersection controller T determines not to allow the vehicle V1 to pass, and transmits a waiting instruction to the vehicle controller of the vehicle V1. Upon receiving the instruction, the vehicle controller of the vehicle V1 controls the vehicle V1 to wait for entering the cross intersection X and continues to transmit a message indicating the request of the vehicle for passing the intersection.

After the vehicle V2 has left the cross intersection X, the intersection controller T removes the information of the vehicle V2 from the occupation list, such that the occupation list contains only the record of the vehicle V3 and its moving direction from West to East. In this case, the intersection controller T determines that the moving directions of the vehicles V1 and V3 do not conflict and there is only one vehicle currently occupying the intersection, determines to allow the vehicle V1 to pass, and transmits an allow-to-pass instruction to the vehicle controller of the vehicle V1. Upon receiving the instruction, the vehicle controller of the vehicle V1 controls the vehicle V1 to enter and pass the cross intersection X.

TABLE 7

Message Indicating Request of Vehicle for Passing Intersection

| Vehicle | Moving Direction |
|---------|------------------|
| V1      | From West to East |

TABLE 8

Occupation List (Number of Vehicles <2)

| Vehicle | Moving Direction |
|---------|------------------|
| V2      | From West to East |
| V3      | From West to East |

Example 5

Referring to Table 9 and Table 10, in this embodiment, an intersection controller T controls passage at a cross intersection X. When a vehicle V1 passes one or more triggers provided at two sides of a road and having a distance of 500 meters from the cross intersection X, the one or more triggers trigger a vehicle controller mounted on the vehicle V1 to transmit to the intersection controller T a message indicating a request of the vehicle for passing the intersection. The message indicates a predetermined moving direction of the vehicle V1 as from West to East and a type of the vehicle V1 as a passenger car. The intersection controller T retrieves an occupation list for the cross intersection X, which contains a record of a vehicle V2, its moving direction from West to East and its type of vehicle as a heavy container truck.

The intersection controller T determines that the moving directions of the vehicles V1 and V2 do not conflict, but the cross intersection X cannot be occupied by a heavy container truck and any other vehicle at the same time. Thus, the intersection controller T determines not to allow the vehicle V1 to pass, and transmits a waiting instruction to the vehicle controller of the vehicle V1. Upon receiving the instruction, the vehicle controller of the vehicle V1 controls the vehicle V1 to wait for entering the cross intersection X and continues to transmit a message indicating the request of the vehicle for passing the intersection.

After the vehicle V2 has left the cross intersection X, the intersection controller T removes the information of the vehicle V2 from the occupation list, such that the occupation list becomes empty. In this case, the intersection controller T determines to allow the vehicle V1 to pass, and transmits an allow-to-pass instruction to the vehicle controller of the vehicle V1. Upon receiving the instruction, the vehicle controller of the vehicle V1 controls the vehicle V1 to enter and pass the cross intersection X.

TABLE 9

Message Indicating Request of Vehicle for Passing Intersection

| Vehicle | Moving Direction | Type |
| --- | --- | --- |
| V1 | From West to East | Passenger Car |

TABLE 10

Occupation List (intersection cannot be occupied by a heavy container truck and another vehicle at the same time)

| Vehicle | Moving Direction | Type |
| --- | --- | --- |
| V2 | From West to East | Heavy Container Truck |

Example 6

Referring to Table 11 and Table 12, in this embodiment, an intersection controller T controls passage at a cross intersection X. Vehicles V1, V2, and V3 move towards the cross intersection X from different directions. When each of the vehicles V1, V2, and V3 passes on or more triggers provided at two sides of a road and having a distance of 500 meters from the cross intersection X, the one or more triggers trigger a vehicle controller mounted on the vehicle to transmit to the intersection controller T a message indicating a request of the vehicle for passing the intersection. The messages indicating the requests of the respective vehicles for passing the intersection as transmitted from the vehicle controllers of the respective vehicles V1, V2, and V3 are received by the intersection controller at the same time. Here, the message indicating the request of the vehicle V1 for passing the intersection indicates a predetermined moving direction from South to North and a type of the vehicle as a passenger car. The message indicating the request of the vehicle V2 for passing the intersection indicates a predetermined moving direction from West to East and a type of the vehicle as an emergency rescue vehicle. The message indicating the request of the vehicle V3 for passing the intersection indicates a predetermined moving direction from North to South and a type of the vehicle as a truck.

The intersection controller T performs the followings operations sequentially.

1) The intersection controller T determines, based on the vehicle attribute information of the vehicles V1, V2, and V3, a priority order of the vehicles as V2, V1, and V3.

2) The intersection controller T retrieves an occupation list, which contains a record of a vehicle V4, its moving direction from South to North and its type of vehicle as a passenger car.

3) The intersection controller T first determines that the moving directions of the vehicles V2 and V4 conflict. Thus, the intersection controller T transmits a waiting instruction to the vehicle controller of the vehicle V2, and transmits a waiting instruction to the vehicle controller of each of the vehicles V1 and V3. After the vehicle V4 has left the intersection X, the intersection controller T removes the information of the vehicle V4 from the occupation list, transmits an allow-to-pass instruction to the vehicle controller of the vehicle V2, and writes the information of the vehicle V2 into the occupation list. The vehicle V2 enters the intersection X.

4) The intersection controller T then determines that the moving directions of the vehicles V1 and V2 conflict. Thus, the intersection controller T continues to transmit a waiting instruction to the vehicle controller of each of the vehicles V1 and V3. After the vehicle V2 has left the intersection X, the intersection controller T removes the information of the vehicle V2 from the occupation list, transmits an allow-to-pass instruction to the vehicle controller of the vehicle V1, and writes the information of the vehicle V1 into the occupation list. The vehicle V1 enters the intersection X.

5) Finally, the intersection controller T determines that the moving directions of the vehicles V3 and V1 do not conflict. Thus, the intersection controller T transmits an allow-to-pass instruction to the vehicle controller of the vehicle V3, and writes the information of the vehicle V3 into the occupation list. The vehicle V3 enters the intersection X. After the vehicles V1 and V3 have left the cross intersection X, the intersection controller T removes the information of the vehicle V1 and V3 from the occupation list.

TABLE 11

Message Indicating Request of Vehicle for Passing Intersection

| Vehicle | Moving Direction | Type |
| --- | --- | --- |
| V1 | From South to North | Passenger Car |
| V2 | From West to East | Emergency Rescue Vehicle |
| V3 | From North to South | Truck |

TABLE 12

Occupation List

| Vehicle | Moving Direction | Type |
| --- | --- | --- |
| V4 | From South to North | Passenger Car |

Example 7

Referring to Table 13 and Table 14, in this embodiment, an intersection controller T controls passage at a cross intersection X. Vehicles V1, V2, and V3 move towards the cross intersection X from different directions. Vehicle controllers of the respective vehicles V1, V2, and V3 detect the intersection X simultaneously and transmit to the intersection controller T messages indicating requests of the respective vehicles for passing the intersection. The messages indicating the requests of the respective vehicles for passing the intersection as transmitted from the vehicle controllers of the respective vehicles V1, V2, and V3 are received by the intersection controller at the same time. Here, the message indicating the request of the vehicle V1 for passing the intersection indicates a predetermined moving direction from South to North, a type of the vehicle as an emergency rescue vehicle, and a current position on a trunk road and having a distance of 500 meters from the intersection. The message indicating the request of the vehicle V2 for passing the intersection indicates a predetermined moving direction from West to East, a type of the vehicle as a passenger car, and a current position on a branch road and having a distance of 400 meters from the intersection. The message indicating the request of the vehicle V3 for passing the intersection indicates a predetermined moving direction from South to North, a type of the vehicle as a truck, and a current position on a trunk road and having a distance of 300 meters from the intersection.

The intersection controller T performs the followings operations sequentially.

1) First of all, the intersection controller T determines, based on the vehicle attribute information of the vehicles V1, V2, and V3, a priority order of the vehicles as V1, V2, and V3.

2) However, as V3 is at the position between V1 and the intersection, V1 has to enter the intersection after V3. In this case, the priority order is adjusted to be V3, V1, and V2.

3) The intersection controller T retrieves an occupation list, which contains a record of a vehicle V4, its moving direction from South to North and its type of vehicle as a passenger car.

4) The intersection controller T first determines that the moving directions of the vehicles V3 and V4 do not conflict. Thus, the intersection controller T transmits an allow-to-pass instruction to the vehicle controller of the vehicle V3, such that the vehicle V3 can enter the intersection. At this time, the intersection controller T writes the information of the vehicle V3 into the occupation list. The vehicle V3 enters the intersection.

5) The intersection controller T then determines that the moving directions of the vehicles V1 and V3 do not conflict. Thus, the intersection controller T transmits an allow-to-pass instruction to the vehicle controller of the vehicle V1. The vehicle V1 enters the intersection. At this time, the intersection controller T writes the information of the vehicle V1 into the occupation list.

6) Finally, the intersection controller T determines that the moving directions of the vehicles V2 and V1 conflict. Thus, the intersection controller T transmits a waiting instruction to the vehicle V2. The vehicle controller of the vehicle V2 controls V2 to wait for entering the intersection.

7) After the vehicles V3 and V1 have left the intersection, the intersection controller T removes the information of the vehicle V3 and V1 from the occupation list and transmits an allow-to-pass instruction to the vehicle V2. The vehicle V2 enters the intersection. At this time, the intersection controller T writes the information of the vehicle V2 into the occupation list. After the vehicle V2 has left the cross intersection X, the intersection controller T removes the information of the vehicle V2 from the occupation list.

TABLE 13

Message Indicating Request of Vehicle for Passing Intersection

| Vehicle | Moving Direction | Type | Position Data |
| --- | --- | --- | --- |
| V1 | From South to North | Emergency Rescue Vehicle | Trunk Road, 500 m from intersection |
| V2 | From West to East | Passenger Car | Branch Road, 400 m from intersection |
| V3 | From South to North | Truck | Trunk Road, 300 m from intersection |

TABLE 14

Occupation List

| Vehicle | Moving Direction | Type |
| --- | --- | --- |
| V4 | From South to North | Passenger Car |

Example 8

Figure 5:
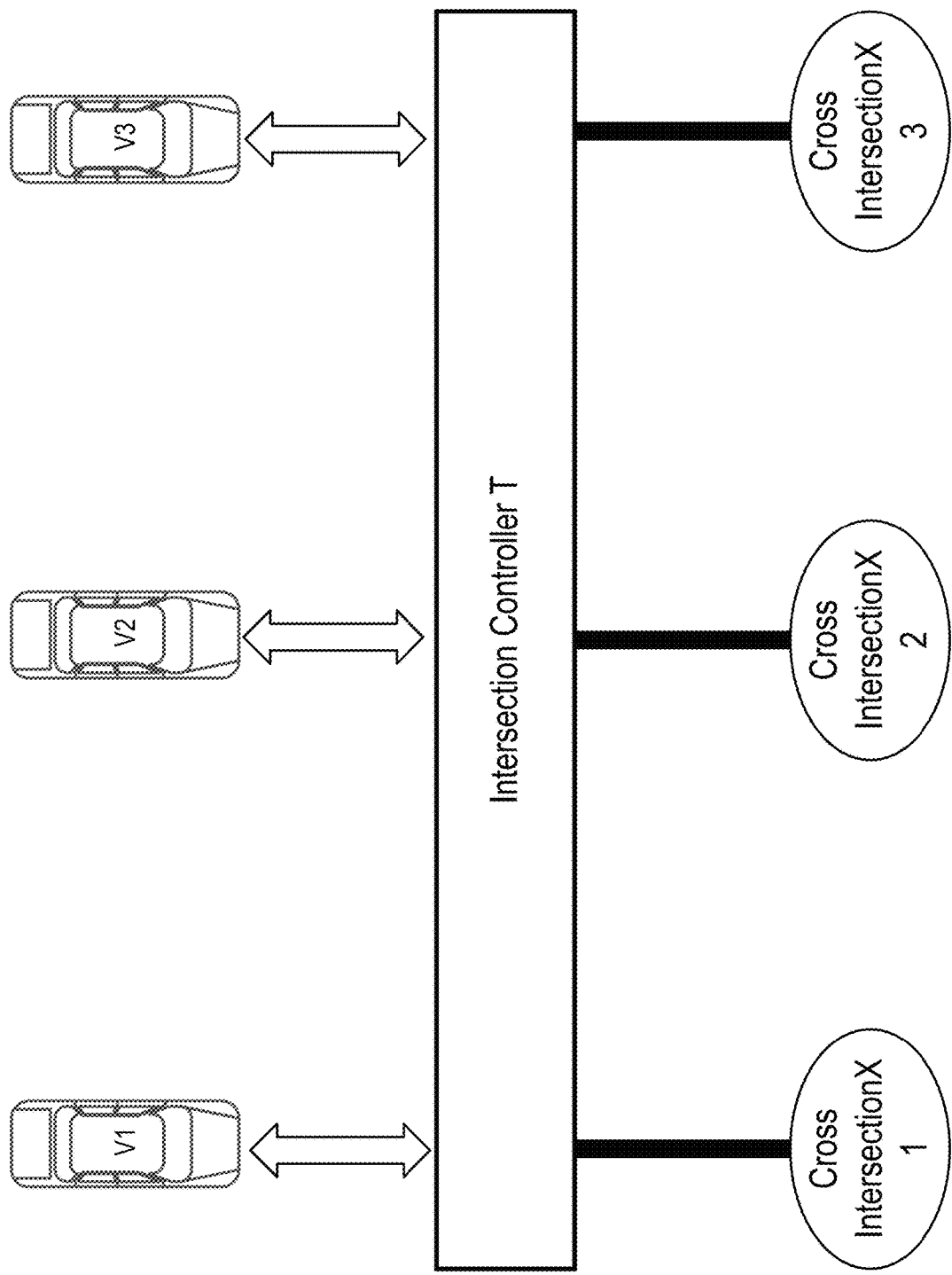
FIG. 5 schematically shows an intersection controller controlling vehicles to pass a plurality of intersections according to another embodiment of the present disclosure.

Referring to Table 15 and FIG. 5, in this embodiment, an intersection controller T controls passage at cross intersections X1, X2, and X3. Vehicles V1, V2, and V3 move towards the cross intersections X1, X2, and X3, respectively. Vehicle controllers of the respective vehicles V1, V2, and V3 transmit to the intersection controller T messages indicating requests of the respective vehicles for passing the respective intersections. Here, the message indicating the request of the vehicle V1 for passing the intersection indicates a predetermined moving direction from South to North and the requested intersection X1. The message indicating the request of the vehicle V2 for passing the intersection indicates a predetermined moving direction from West to East and the requested intersection X2. The message indicating the request of the vehicle V3 for passing the intersection indicates a predetermined moving direction from South to North and the requested intersection X3.

The intersection controller T determines from the messages that the vehicles V1, V2, and V3 request to pass the cross intersections X1, X2, and X3, respectively, retrieves occupation lists for the respective cross intersections X1, X2, and X3, and determines whether to allow the vehicles V1, V2, and V3 to pass the cross intersections X1, X2, and X3, respectively. For further details, reference can be made to the above examples 1-7, and description thereof will be omitted here.

TABLE 15

Message Indicating Request of Vehicle for Passing Intersection

| Vehicle | Moving Direction | Intersection Identifier |
| --- | --- | --- |
| V1 | From South to North | X1 |
| V2 | From West to East | X2 |
| V3 | From South to North | X3 |

Example 9

Figure 6:
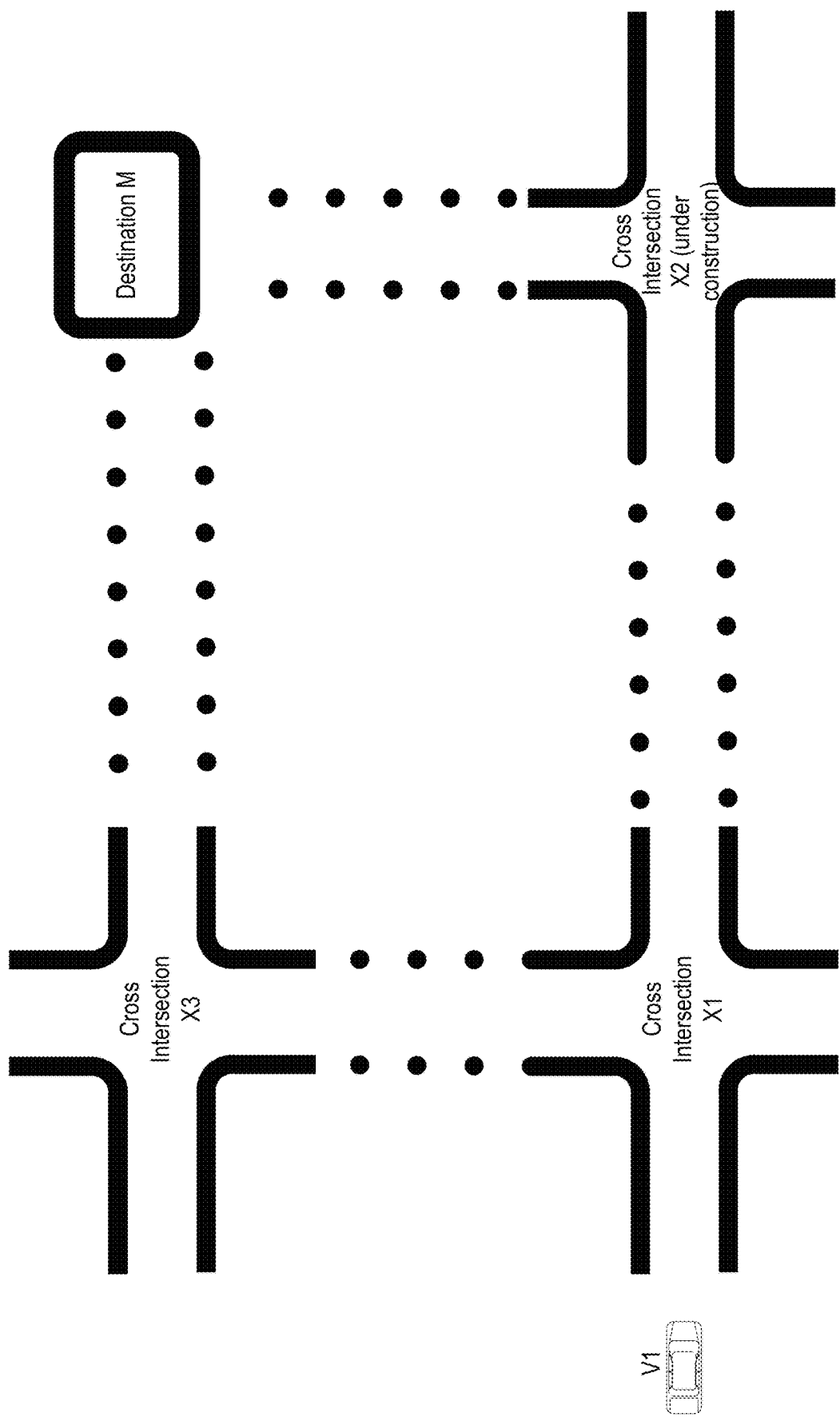
FIG. 6 schematically shows an intersection controller planning a route of a vehicle according to another embodiment of the present disclosure.

In this embodiment, as shown in FIG. 6, an intersection controller T controls passage at cross intersections X1, X2, and X3. Here, X2 is the next intersection of X1 in the direction from West to East, and X3 is the next intersection of X1 in the direction from South to North. The vehicle V1 moves towards the cross intersection X1, and a vehicle controller of the vehicle V1 transmits to the intersection controller T a message indicating a request of the vehicle V1 for passing the intersection. Here, the message indicating the request of the vehicle V1 for passing the intersection contains a predetermined moving direction from West to East and a destination M. The intersection controller T determines from the message transmitted from V1 that the next intersection in its moving direction is X2, and determines that the intersection X2 is under construction and is not passable, but the vehicle V1 can reach the destination M by changing its moving direction to from West to North at the intersection X1 and then passing the intersection X3. In this case, the intersection controller T transmits to the vehicle controller of the vehicle V1 a message indicating that the intersection X2 is under construction and is not passable and suggesting the vehicle V1 to reach the destination M by changing its moving direction to from West to North and then passing the intersection X3.

Based on the concept of the present disclosure, according to the embodiments of the present disclosure, a navigation method for a cross intersection applied at an intersection side and a navigation method for a cross intersection applied at a vehicle side are provided, which will be described below.

Figure 7:
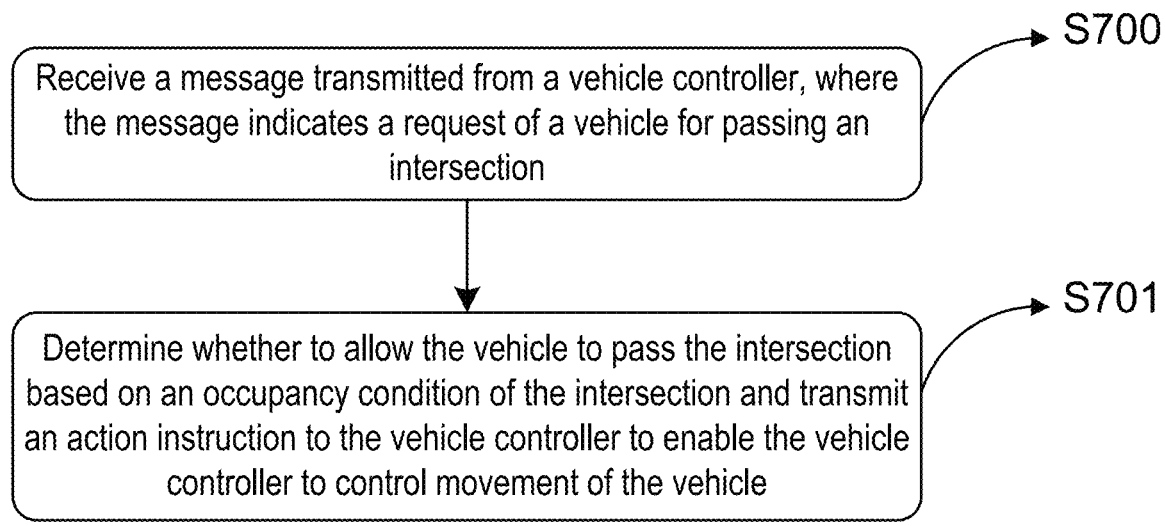
FIG. 7 schematically shows a process flow of a navigation method for a cross intersection applied at an intersection side according to another embodiment of the present disclosure.

According to an embodiment of the present disclosure, a navigation method for a cross intersection applied at an intersection side is provided. As shown in FIG. 7, the method includes the following steps.

At step S700, a message transmitted from a vehicle controller is received. The message indicates a request of a vehicle for passing an intersection.

At step S701, it is determined whether to allow the vehicle to pass the intersection based on an occupancy condition of the intersection, and an action instruction is transmitted to the vehicle controller to cause the vehicle controller to control movement of the vehicle.

Optionally, the message indicating the request of the vehicle for passing the intersection may contain a predetermined moving direction of the vehicle. In this case, the step S701 may include:

determining to allow the vehicle to pass the intersection when determining that the intersection is not occupied or that the intersection is occupied but the predetermined moving direction of the vehicle does not conflict with a moving direction of a vehicle currently occupying the intersection, and transmitting an allow-to-pass instruction to the vehicle controller to cause the vehicle controller to control the vehicle to enter and pass the intersection; or determining not to allow the vehicle to pass the intersection when determining that the intersection is occupied and the predetermined moving direction of the vehicle conflicts with the moving direction of the vehicle currently occupying the intersection, and transmitting a waiting instruction to the vehicle controller to cause the vehicle controller to control the vehicle to wait for entering the intersection.

Optionally, in the step S701, it can be determined whether the intersection is occupied or not by: determining that the intersection is not occupied when no vehicle is currently moving in the intersection and no vehicle is predetermined to enter the intersection; and determining that the intersection is occupied when there is a vehicle currently moving in the intersection and/or there is a vehicle predetermined to enter the intersection. Here, the vehicle currently occupying the intersection can be determined as a vehicle currently moving in the intersection and/or a vehicle predetermined to enter the intersection.

Optionally, the step S701 may further include: determining not to allow the vehicle to pass the intersection when determining that there are a predetermined number of vehicles currently occupying the intersection, and transmitting the waiting instruction to the vehicle controller to cause the vehicle controller to control the vehicle to wait for entering the intersection.

Optionally, the message indicating the request of the vehicle for passing the intersection may contain a type of the vehicle. In this case, the step S701 may include:

determining not to allow the vehicle to pass the intersection when determining that the vehicle currently occupying the intersection belongs to a predetermined type or that the intersection is occupied and the vehicle belongs to a predetermined type, and transmitting the waiting instruction to the vehicle controller to cause the vehicle controller to control the vehicle to wait for entering the intersection.

Optionally, the step S701 may further include: writing an identifier and the predetermined moving direction of the vehicle into an occupancy list associated with the intersection when determining to allow the vehicle to pass the intersection; removing the identifier and the predetermined moving direction of the vehicle from the occupancy list associated with the intersection when determining that the vehicle has passed and left the intersection; and determining the occupancy condition of the intersection based on the occupancy list.

Optionally, in an embodiment of the present disclosure, the navigation method for the cross intersection applied at the intersection side may further include: receiving a message transmitted from the vehicle controller when the vehicle has passed and left the intersection and indicating that the vehicle has passed the intersection.

Optionally, in an embodiment of the present disclosure, the navigation method for the cross intersection applied at the intersection side may further include: determining not to allow the vehicle to pass the intersection when determining that the intersection is under construction, and transmitting a first notification message to the vehicle controller.

Optionally, the message indicating the request of the vehicle for passing the intersection may contain a predetermined moving direction of the vehicle. In an embodiment of the present disclosure, the navigation method for the cross intersection applied at the intersection side may further include: determining not to allow the vehicle to pass the intersection when determining that the predetermined moving direction of the vehicle violates a traffic rule for the intersection, and transmitting a second notification message to the vehicle controller.

Optionally, the message indicating the request of the vehicle for passing the intersection may contain attribute information of the vehicle. In an embodiment of the present disclosure, the navigation method for the cross intersection applied at the intersection side may further include: when receiving messages indicating respective requests of a plurality of vehicles for passing the intersection, determining a priority order based on the attribute information of each of the plurality of vehicles, as an order in which the plurality of vehicles are to pass the intersection.

Optionally, the message indicating the request of the vehicle for passing the intersection may contain position information of the vehicle. In an embodiment of the present disclosure, the navigation method for the cross intersection applied at the intersection side may further include: when determining from the position information of the vehicle that a vehicle having a higher priority in the priority order and a vehicle having a lower priority in the priority order are in a same lane and the vehicle having the higher priority has to enter the intersection after the vehicle having the lower priority, ranking the vehicle having the lower priority before the vehicle having the higher priority.

Optionally, in an embodiment of the present disclosure, the navigation method for the cross intersection applied at the intersection side may further include: when determining that the vehicle has been waiting for entering the intersection for a time period longer than a predetermined time length, assigning the vehicle with a higher priority in the priority order.

Optionally, the message indicating the request of the vehicle for passing the intersection may contain an identifier of the intersection. In an embodiment of the present disclosure, the navigation method for the cross intersection applied at the intersection side may further include: monitoring an occupancy condition of each of a plurality of intersections, and determining the intersection based on the identifier of the intersection and obtaining the occupancy condition of the intersection.

Optionally, the message indicating the request of the vehicle for passing the intersection may contain destination information of the vehicle. In an embodiment of the present disclosure, the navigation method for the cross intersection applied at the intersection side may further include: planning a route for the vehicle based on the destination information of the vehicle and the occupancy condition of each of the plurality of intersections, and transmitting the route to the vehicle controller.

The navigation method for the cross intersection applied at the intersection side as shown in FIG. 7 is implemented based on the same inventive concept as the navigation method for the cross intersection as shown in FIG. 1. For specific implementations of the method shown in FIG. 7, reference can be made to the navigation method for the cross intersection as shown in FIG. 1, and details thereof will be omitted here.

Figure 8:
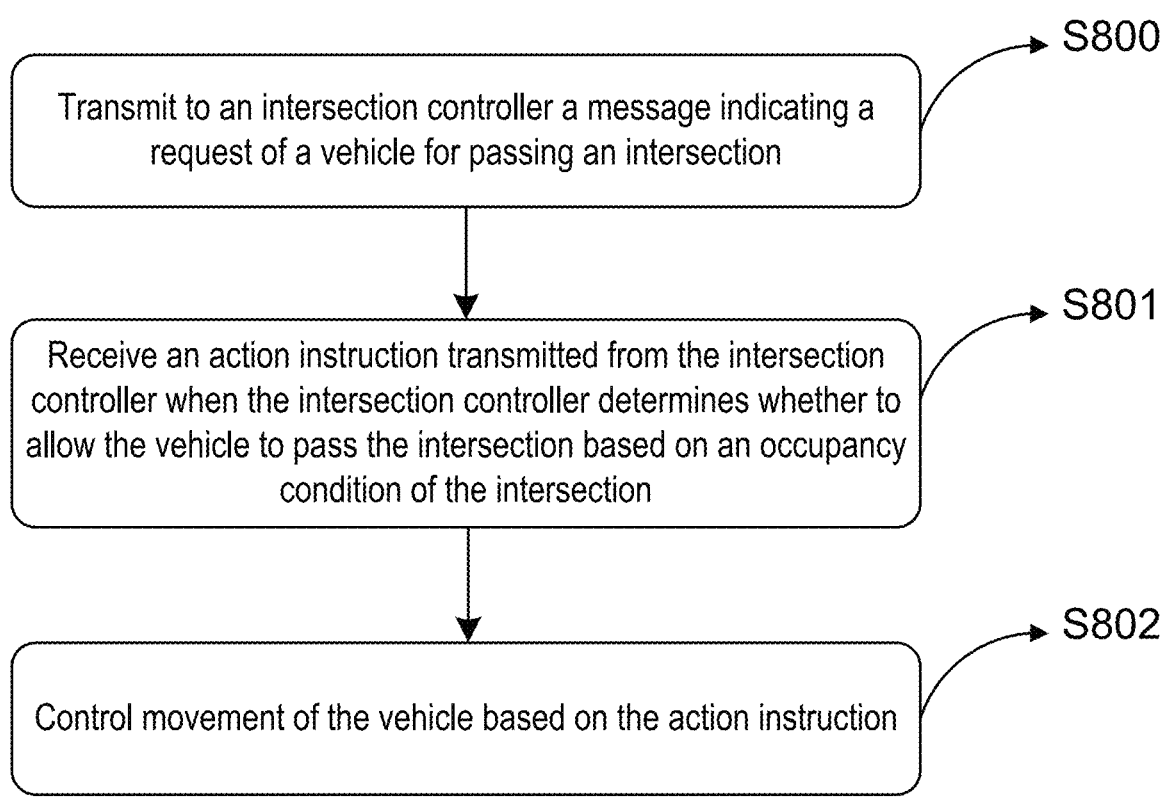
FIG. 8 schematically shows a process flow of a navigation method for a cross intersection applied at a vehicle side according to another embodiment of the present disclosure.

According to an embodiment of the present disclosure, a navigation method for a cross intersection applied at a vehicle side is provided. As shown in FIG. 8, the method includes the following steps.

At step S800, a message indicating a request of a vehicle for passing an intersection is transmitted to an intersection controller.

At step S801, an action instruction is received. The action instruction is transmitted from the intersection controller when determining whether to allow the vehicle to pass the intersection based on an occupancy condition of the intersection.

At step S802, movement of the vehicle is controlled based on the action instruction.

Optionally, the step S800 may include: transmitting to the intersection controller the message indicating the request of the vehicle for passing the intersection when a distance between the vehicle and the intersection is smaller than or equal to a predetermined distance; or transmitting to the intersection controller the message indicating the request of the vehicle for passing the intersection upon detecting the intersection.

Optionally, the step S800 may include: transmitting to the intersection controller the message indicating the request of the vehicle for passing the intersection, when triggered by one or more triggers provided on two sides of a road with a predetermined distance.

Optionally, in the step S800, the message indicating the request of the vehicle for passing the intersection may contain a predetermined moving direction of the vehicle.

Accordingly, the step S801 may include: receiving an allow-to-pass instruction transmitted from the intersection controller when determining to allow the vehicle to pass the intersection in response to determining that the intersection is not occupied or that the intersection is occupied but the predetermined moving direction of the vehicle does not conflict with a moving direction of a vehicle currently occupying the intersection, or a waiting instruction transmitted from the intersection controller when determining not to allow the vehicle to pass the intersection in response to determining that the intersection is occupied and the predetermined moving direction of the vehicle conflicts with the moving direction of the vehicle currently occupying the intersection.

Accordingly, the step S802 may further include: controlling the vehicle to enter and pass the intersection based on the allow-to-pass instruction, or controlling the vehicle to wait for entering the intersection and continuing to transmit to the intersection controller a message indicating the request of the vehicle for passing the intersection.

Optionally, the step S801 may further include: receiving the waiting instruction transmitted from the intersection controller when determining not to allow the vehicle to pass the intersection in response to determining that there are a predetermined number of vehicles currently occupying the intersection.

Optionally, in the step S800, the message indicating the request of the vehicle for passing the intersection may further contain a type of the vehicle. In this case, the step S801 may further include: receiving the waiting instruction transmitted from the intersection controller when determining not to allow the vehicle to pass the intersection in response to determining that the vehicle currently occupying the intersection belongs to a predetermined type or that the intersection is occupied and the vehicle belongs to a predetermined type.

Optionally, in an embodiment of the present disclosure, the navigation method for the cross intersection applied at the vehicle side may further include: when the vehicle has passed and left the intersection, transmitting to the intersection controller a message indicating that the vehicle has passed the intersection.

Optionally, in an embodiment of the present disclosure, the navigation method for the cross intersection applied at the vehicle side may further include: determining that the vehicle has passed and left the intersection after detecting a dedicated pile provided at a junction of the intersection and a road while the vehicle is moving toward a direction away from the intersection, and transmitting to the intersection controller the message indicating that the vehicle has passed the intersection.

Optionally, in an embodiment of the present disclosure, the navigation method for the cross intersection applied at the vehicle side may further include: receiving a first notification message transmitted from the intersection controller, when the intersection controller determines not to allow the vehicle to pass the intersection in response to determining that the intersection is under construction.

Optionally, in the step S800, the message indicating the request of the vehicle for passing the intersection may contain a predetermined moving direction of the vehicle. In this case, in an embodiment of the present disclosure, the navigation method for the cross intersection applied at the vehicle side may further include: receiving a second notification message transmitted from the intersection controller, when the intersection controller determines not to allow the vehicle to pass the intersection in response to determining that the predetermined moving direction of the vehicle violates a traffic rule for the intersection.

Optionally, in the step S800, the message indicating the request of the vehicle for passing the intersection may contain attribute information of the vehicle.

Optionally, in the step S800, the message indicating the request of the vehicle for passing the intersection may contain position information of the vehicle.

Optionally, in the step S800, the message indicating the request of the vehicle for passing the intersection may contain an identifier of the intersection requested by the vehicle.

Optionally, in the step S800, the message indicating the request of the vehicle for passing the intersection may contain destination information of the vehicle. In an embodiment of the present disclosure, the navigation method for the cross intersection applied at the vehicle side may further include: receiving a route planned for the vehicle from the intersection controller, where the route is planned by the intersection controller based on the destination information of the vehicle and an occupancy condition of each of a plurality of intersections.

The navigation method for the cross intersection applied at the vehicle side as shown in FIG. 8 is implemented based on the same inventive concept as the navigation method for the cross intersection as shown in FIG. 1. For specific implementations of the method shown in FIG. 8, reference can be made to the navigation method for the cross intersection as shown in FIG. 1, and details thereof will be omitted here.

It should be noted that while the operations of the methods according to the present disclosure have been described in particular orders in the figures, it does not require or imply that these operations are necessarily to be performed in the particular orders, or that all the illustrated operations are necessarily to be performed to achieve the desired results. Additionally or alternatively, some steps may be omitted, a plurality of steps may be combined into one step, and/or one step may be divided into a plurality of steps for execution.

Based on the inventive concept of the embodiments of the present disclosure, an intersection controller is provided according to an embodiment of the present disclosure for performing the navigation method for the cross intersection applied at the intersection side, which will be described in detailed below.

Figure 11:
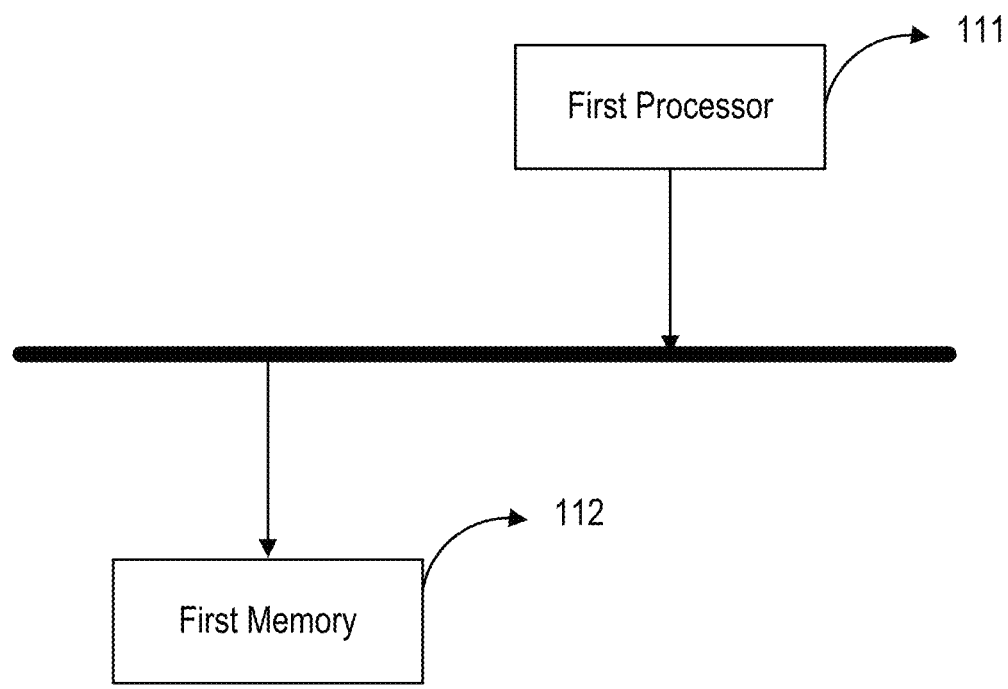
FIG. 11 schematically shows a block diagram of an intersection controller according to another embodiment of the present disclosure.

According to an embodiment of the present disclosure, an intersection controller is provided. As shown in FIG. 11, the intersection controller includes a first processor 111, a first memory 112, and a computer program stored on the first memory 112 and executable by the first processor 111. The first processor 111 is configured to execute the computer program in the first memory 112 to perform the navigation method for the cross intersection applied at the intersection side as shown in FIG. 7, including: receiving a message transmitted from a vehicle controller, where the message indicates a request of a vehicle for passing an intersection; and determining whether to allow the vehicle to pass the intersection based on an occupancy condition of the intersection and transmitting an action instruction to the vehicle controller to cause the vehicle controller to control movement of the vehicle.

The method performed by executing the computer program in the first memory 112 is implemented based on the same inventive concept as the above navigation method for the cross intersection shown in FIG. 1 and has the same non-limiting embodiments as the above navigation method for the cross intersection shown in FIG. 1. For further details, reference can be made to the method as described above in connection with FIG. 1 and the description thereof will be omitted here.

Optionally, in an embodiment of the present disclosure, the first processor 111 may be implemented as a circuit, a chip or any other electronic component. For example, the first processor 111 may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in an embodiment of the present disclosure, the first memory 112 may be implemented as a circuit, a chip or any other electronic component. For example, the first memory 112 can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Optionally, in an embodiment of the present disclosure, the intersection controller can be provided at the intersection or somewhere outside the intersection. It can be installed at a fixed position or on a device moving over time. For example, when the intersection controller is configured to control vehicle passage at one intersection, it can be installed at the intersection it controls. Alternatively, the intersection controllers for all intersections can be installed together in a centralized manner, e.g., in a central control room for monitoring all intersections. When the intersection controller is configured to control vehicle passage at a plurality of intersections within a particular area (e.g., a highway port, a mining area, a goods distribution center, a railway station, an airport, a factory, a coastal port, or the like), it can be installed in a central control room for monitoring the plurality of intersections in the area or on a vehicle that moves back and forth between the plurality of intersections.

Based on the inventive concept of the present disclosure, the present disclosure also provides a computer readable storage medium. The computer readable storage medium has a computer program stored thereon. The computer program, when executed by a processor, causes the processor to perform the navigation method for the cross intersection applied at the intersection side. The storage medium may be one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Based on the inventive concept of the embodiments of the present disclosure, a vehicle controller is provided according to an embodiment of the present disclosure for performing the navigation method for the cross intersection applied at the vehicle side, which will be described in detailed below.

Figure 12:
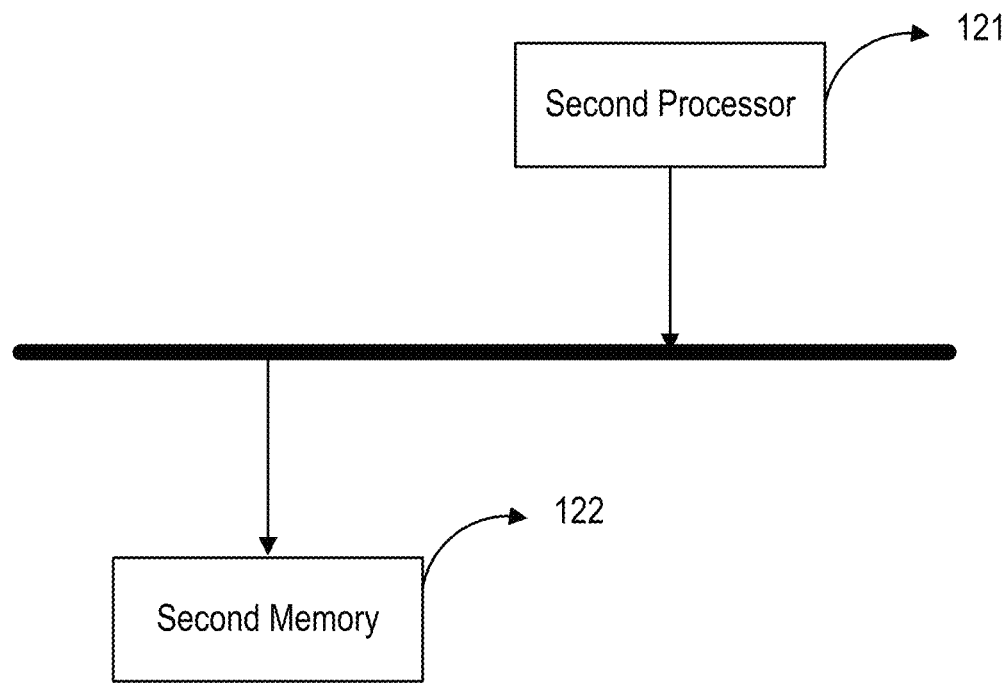
FIG. 12 schematically shows a block diagram of a vehicle controller according to another embodiment of the present disclosure.

According to an embodiment of the present disclosure, a vehicle controller is provided. As shown in FIG. 12, the vehicle controller includes a second processor 121, a second memory 122, and a computer program stored on the second memory 122 and executable by the second processor 121. The second processor 121 is configured to execute the computer program in the second memory 122 to the navigation method for the cross intersection applied at the vehicle side as shown in FIG. 8, including: transmitting to an intersection controller a message indicating a request of a vehicle for passing an intersection; receiving an action instruction transmitted from the intersection controller when the intersection controller determines whether to allow the vehicle to pass the intersection based on an occupancy condition of the intersection; and controlling movement of the vehicle based on the action instruction.

The method performed by executing the computer program in the second memory 122 is implemented based on the same inventive concept as the above navigation method for the cross intersection shown in FIG. 1 and has the same non-limiting embodiments as the above navigation method for the cross intersection shown in FIG. 1. For further details, reference can be made to the method as described above in connection with FIG. 1 and the description thereof will be omitted here.

Optionally, in an embodiment of the present disclosure, the second processor 121 may be implemented as a circuit, a chip or any other electronic component. For example, the second processor 121 may also include one or more microcontrollers, one or more Field Programmable Gate Arrays (FPGAs), one or more Application Specific Integrated Circuits (ASICs), one or more Digital Signal Processors (DSPs), one or more integrated circuits, and the like.

Optionally, in an embodiment of the present disclosure, the second memory 122 may be implemented as a circuit, a chip or any other electronic component. For example, the second memory 122 can include one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Optionally, in an embodiment of the present disclosure, a vehicle controller can be a server, a PC, a laptop computer, a tablet computer, a PDA, a computer device such as an iMac, or the like, which can be installed on a vehicle.

Based on the inventive concept of the present disclosure, the present disclosure also provides a computer readable storage medium. The computer readable storage medium has a computer program stored thereon. The computer program, when executed by a processor, causes the processor to perform the navigation method for the cross intersection at the vehicle side. The storage medium may be one or more Read Only Memories (ROMs), Random Access Memories (RAMs), flash memories, Electrically Programmable ROMs (EPROMs), Electrically Programmable and Erasable ROMs (EEPROMs), embedded Multi-Media Cards (eMMCs), hard drives or any volatile or non-volatile mediums.

Based on the inventive concept of the present disclosure, a vehicle is provided according to an embodiment of the present disclosure. The vehicle includes the above vehicle controller. The vehicle transmits, via the vehicle controller, to an intersection controller a message indicating a request of a vehicle for passing an intersection. The vehicle receives, via the vehicle controller, an action instruction transmitted from the intersection controller when determining whether to allow the vehicle to pass the intersection based on an occupancy condition of the intersection. The vehicle has its movement controlled by the vehicle controller based on the action instruction. In practice, the vehicle can be a legacy vehicle driven by a human, such as a passenger car, a truck, an engineering vehicle, a fire engine, an ambulance, or a truck, or can be an unmanned vehicle. The vehicle can be a vehicle consuming traditional energy such as gasoline or diesel, or a vehicle consuming new energy such as electrical energy or solar energy.

Based on the concept of the present disclosure, a navigation system for a cross intersection is provided according to an embodiment of the present disclosure. The navigation system includes a vehicle controller and an intersection controller, which are configured to perform the navigation method for the cross intersection shown in FIG. 1 as follows. The vehicle controller is configured to transmit to the intersection controller a message indicating a request of a vehicle for passing an intersection. The intersection controller is configured to determine whether to allow the vehicle to pass the intersection based on an occupancy condition of the intersection and transmit an action instruction to the vehicle controller. The vehicle controller is further configured to control movement of the vehicle based on the action instruction.

The navigation system for the cross intersection according to this embodiment is implemented based on the same inventive concept as the above navigation method for the cross intersection shown in FIG. 1 and has the same non-limiting embodiments as the above navigation method for the cross intersection shown in FIG. 1.

Optionally, the vehicle controller can be further configured to: transmit to the intersection controller the message indicating the request of the vehicle for passing the intersection when a distance between the vehicle and the intersection is smaller than or equal to a predetermined distance; or transmit to the intersection controller the message indicating the request of the vehicle for passing the intersection upon detecting the intersection.

Optionally, the vehicle controller can be further configured to include a predetermined moving direction of the vehicle in the message indicating the request of the vehicle for passing the intersection. Accordingly, the intersection controller can be further configured to determine to allow the vehicle to pass the intersection when determining that the intersection is not occupied or that the intersection is occupied but the predetermined moving direction of the vehicle does not conflict with a moving direction of a vehicle currently occupying the intersection, and transmit an allow-to-pass instruction to the vehicle controller; or determine not to allow the vehicle to pass the intersection when determining that the intersection is occupied and the predetermined moving direction of the vehicle conflicts with the moving direction of the vehicle currently occupying the intersection, and transmit a waiting instruction to the vehicle controller. Accordingly, the vehicle controller can be further configured to: control the vehicle to enter and pass the intersection based on the allow-to-pass instruction, or control the vehicle to wait for entering the intersection and continue to transmit to the intersection controller a message indicating the request of the vehicle for passing the intersection.

Optionally, the intersection is not occupied when no vehicle is currently moving in the intersection and no vehicle is predetermined to enter the intersection. The intersection is occupied when there is a vehicle currently moving in the intersection and/or there is a vehicle predetermined to enter the intersection. The vehicle currently occupying the intersection may include a vehicle currently moving in the intersection and/or a vehicle predetermined to enter the intersection.

Optionally, the intersection controller can be further configured to determine not to allow the vehicle to pass the intersection when determining that there are a predetermined number of vehicles currently occupying the intersection, and transmit the waiting instruction to the vehicle controller.

Optionally, the vehicle controller can be further configured to include a type of the vehicle in the message indicating the request of the vehicle for passing the intersection. The intersection controller can be further configured to determine not to allow the vehicle to pass the intersection when determining that the vehicle currently occupying the intersection belongs to a predetermined type or that the intersection is occupied and the vehicle belongs to a predetermined type, and transmit the waiting instruction to the vehicle controller.

Optionally, the intersection controller can be further configured to write an identifier and the predetermined moving direction of the vehicle into an occupancy list associated with the intersection when determining to allow the vehicle to pass the intersection; remove the identifier and the predetermined moving direction of the vehicle from the occupancy list associated with the intersection when determining that the vehicle has passed and left the intersection; and determine the occupancy condition of the intersection based on the occupancy list.

Optionally, the vehicle controller can be further configured to transmit, when the vehicle has passed and left the intersection, to the intersection controller a message indicating that the vehicle has passed the intersection.

Optionally, the intersection controller can be further configured to determine not to allow the vehicle to pass the intersection when determining that the intersection is under construction, and transmit a first notification message to the vehicle controller.

Optionally, the vehicle controller can be further configured to include a predetermined moving direction of the vehicle in the message indicating the request of the vehicle for passing the intersection. The intersection controller can be further configured to determine not to allow the vehicle to pass the intersection when determining that the predetermined moving direction of the vehicle violates a traffic rule for the intersection, and transmit a second notification message to the vehicle controller.

Optionally, the vehicle controller can be further configured to include attribute information of the vehicle in the message indicating the request of the vehicle for passing the intersection. The intersection controller can be further configured to determine, when receiving messages indicating respective requests of a plurality of vehicles for passing the intersection, a priority order based on the attribute information of each of the plurality of vehicles, as an order in which the plurality of vehicles are to pass the intersection.

Optionally, the vehicle controller can be further configured to include position information of the vehicle in the message indicating the request of the vehicle for passing the intersection. The intersection controller can be further configured to, when determining from the position information of the vehicle that a vehicle having a higher priority in the priority order and a vehicle having a lower priority in the priority order are in a same lane and the vehicle having the higher priority has to enter the intersection after the vehicle having the lower priority, rank the vehicle having the lower priority before the vehicle having the higher priority.

Optionally, the intersection controller can be further configured to assign, when determining that the vehicle has been waiting for entering the intersection for a time period longer than a predetermined time length, the vehicle with a higher priority in the priority order.

Optionally, the vehicle controller can be further configured to include an identifier of the intersection in the message indicating the request of the vehicle for passing the intersection. The intersection controller can be further configured to monitor an occupancy condition of each of a plurality of intersections, and determine the intersection based on the identifier of the intersection and obtain the occupancy condition of the intersection.

Optionally, the vehicle controller can be further configured to include destination information of the vehicle in the message indicating the request of the vehicle for passing the intersection. The intersection controller can be further configured to plan a route for the vehicle based on the destination information of the vehicle and the occupancy condition of each of the plurality of intersections, and transmit the route to the vehicle controller.

Optionally, in an embodiment of the present disclosure, the navigation system for the cross intersection may further include: one or more triggers provided on two sides of a road at the predetermined distance from the intersection and configured to trigger the vehicle controller to transmit to the intersection controller the message indicating the request of the vehicle for passing the intersection.

Optionally, in an embodiment of the present disclosure, the navigation system for the cross intersection may further include: a dedicated pile provided at a junction of the intersection and a road. The vehicle controller can be further configured to determine that the vehicle has passed and left the intersection after detecting a dedicated pile provided at a junction of the intersection and a road while the vehicle is moving toward a direction away from the intersection, and transmit to the intersection controller the message indicating that the vehicle has passed the intersection.

The navigation method for the cross intersection according to the embodiment of the present disclosure can achieve navigation for the cross intersection based on a network environment. It can be implemented with low costs and can be applied easily. It does not rely on traffic lights and can be applied widely, especially to closed areas with few traffic lights, such as ports and mining areas. It is implemented based on a network environment and thus is not affected by environmental factors such as light or obstacles. It can process a task associated with a request of a vehicle for passing an intersection when the vehicle is far from the intersection, such that it is possible for the vehicle to pass the intersection without deceleration, which is advantageous in saving energy, improving transportation efficiency and enhancing transportation safety. It can notify a vehicle that an intersection is under construction or no turn or U-turn is allowed at an intersection while the vehicle is far from the intersection, such that the vehicle does not need to backtrack or take a detour at the intersection, which can save time and energy. It can control the number of vehicles passing an intersection simultaneously, so as to avoid accidents due to too many vehicles entering the intersection at the same time. When a specific type of vehicle, such as a heavy container truck or a vehicle carrying hazardous chemicals, is moving in an intersection, it does not allow any other vehicle to enter the intersection, so as to avoid safety risks such type of vehicle may cause to other vehicles when such type of vehicle and other vehicles are in the intersection at the same time. It can determine an order in which vehicles are to pass an intersection based on different attributes of the respective vehicles, such that a specific type of vehicle, such as an emergency rescue vehicle, can pass quickly and conveniently. It can also optimize the order in which the vehicles pass the intersection depending on how long each vehicle has been waiting. One device can handle vehicle passage tasks for a plurality of intersections simultaneously, so as to achieve a high resource utilization. It can monitor an occupancy condition of an intersection to analyze its congestion condition, and plan a more reasonable route of a vehicle based on its destination, so as to facilitate intelligent traffic management, effectively equalize vehicle movement condition within an area, and reduce traffic congestion rate.

The above described embodiments are provided for explaining the objects, solutions and advantageous effects of the present disclosure in further detail. It is to be understood that the above embodiments of the present disclosure are illustrative only, rather than limiting the scope of the present disclosure. All modifications, equivalent, or improvements made within the spirit and scope of the present disclosure are to be encompassed by the scope of the present disclosure.

It can be appreciated by those skilled in the art that various illustrative logical blocks, units, and steps listed in the embodiments of the present disclosure can be implemented by electronic hardware, computer software, or any combination thereof. To clearly illustrate the interchangeability of hardware and software, the various illustrative components, units and steps described above have been generally described with respect to their functions. Whether such functions are to be implemented by hardware or software depends on design requirements of particular applications and the overall system. It can be appreciated by those skilled in the art that for each particular application, the described functions can be implemented using various methods, and such implementations should not be construed as being beyond the scope of the embodiments of the present disclosure.

The various illustrative logic blocks, or units, or devices described in the embodiments of the present disclosure may be implemented by general purpose processors, digital signal processors, Application Specific Integrated Circuits (ASICs), field programmable gate arrays or other programmable logic devices, discrete gates or transistor logics, discrete hardware components, or any combination or design thereof, so as to implement or operate the described functions. A general purpose processor may be a microprocessor. Alternatively, the general purpose processor may be any conventional processor, controller, microcontroller, or state machine. The processor may also be implemented by a combination of computing devices, such as a digital signal processor and a microprocessor, a plurality of microprocessors, one or more microprocessors in combination with a digital signal processor core, or any other similar configurations.

The steps of the method or algorithm described in the embodiments of the present disclosure may be directly embedded in hardware or software modules executed by a processor, or any combination thereof. The software modules can be stored in a RAM, a flash memory, a ROM, an EPROM, an EEPROM, a register, a hard drive, a removable magnetic disk, a CD-ROM, or any other form of storage medium in the art. As an example, the storage medium can be coupled to a processor such that the processor can read information from the storage medium and write information to the storage medium. Alternatively, the storage medium can be integrated into the processor. The processor and the storage medium may be disposed in an ASIC, which can be provided in a user terminal. Alternatively, the processor and the storage medium may also be provided in different components in the user terminal.

In one or more exemplary designs, the functions described above in the embodiments of the present disclosure may be implemented in hardware, software, firmware, or any combination thereof. When implemented in software, these functions may be stored on a computer readable medium or transmitted as one or more instructions or codes to a computer readable medium. Computer readable mediums may include computer storage mediums and communication mediums that facilitates transfer of computer programs from one place to another. The storage medium can be any available medium that any general purpose or special computer can access. For example, such computer readable mediums may include, but not limited to: RAMs, ROMs, EEPROMs, CD-ROMs or other optical storages, magnetic disk storages or other magnetic storage devices, or any other medium that can be used for carrying or storing program codes in instructions, data structures or any other forms that can be read by a general purpose or special computer or a general purpose or special processor. In addition, any connection can be appropriately defined as a computer readable medium. For example, if the software is transmitted from a website, a server, or any other remote sources through a coaxial cable, a fiber optic cable, a twisted pair, a Digital Subscriber Line (DSL) or wirelessly via e.g., infrared, radio, or microwave, it is also included in the defined computer readable medium. The disks and discs include compact disks, laser discs, optical discs, DVDs, floppy disks, and Blu-ray discs. The disks typically replicate data magnetically, while the discs typically optically replicate data with a laser. Any combination of the above may also be included in a computer readable medium.

What is claimed is:

1. A method of unmanned vehicle navigation, comprising:
   receiving, by an intersection controller, a message from a first vehicle for passing through an intersection, the message including a first identifier and a first moving direction of the first vehicle and an identifier of the intersection;
   determining, by the intersection controller, whether to allow the first vehicle to pass through the intersection based on an occupancy list for the intersection, wherein the occupancy list for the intersection is stored in the intersection controller and includes second identifiers and second moving directions of second vehicles that are previously allowed to pass through the intersection and have not cleared the intersection;
   transmitting, by the intersection controller, an action instruction to a vehicle controller of the first vehicle to cause the first vehicle to control movement of the first vehicle based on the determining whether to allow the first vehicle to pass through the intersection;
   writing, by the intersection controller, the first identifier and the first moving direction of the first vehicle into the occupancy list of the intersection, in response to determining to allow the first vehicle to pass through the intersection;
   removing, by the intersection controller, the first identifier and the first moving direction of the first vehicle from the occupancy list of the intersection, in response to determining that the first vehicle has passed and cleared the intersection; and
   removing, by the intersection controller, the second identifiers and second moving directions of at least one of the second vehicles from the occupancy list upon a determination that the at least one of the second vehicles has passed and cleared the intersection.

2. The method of claim 1, wherein the action instruction includes an allow-to-pass instruction to cause the first vehicle to enter the intersection, wherein the allow-to-pass instruction is transmitted to the vehicle controller of the first vehicle upon a determination that no vehicle is currently moving in the intersection and that no vehicle is predetermined to enter the intersection.

3. The method of claim 1, wherein the action instruction includes a waiting instruction that causes the vehicle controller to wait for entering the intersection, wherein the waiting instruction is transmitted to the vehicle controller of the first vehicle upon a determination that the intersection is occupied by at least one of the second vehicles and the second moving direction of at least one of the second vehicles in the occupancy list conflicts with the first moving direction of the first vehicle.

4. The method of claim 3, wherein the intersection is occupied by at least one of the second vehicles comprising at least one of the second vehicles is predetermined to enter the intersection even though the at least one of the second vehicles has not arrived at the intersection.

5. The method of claim 1, wherein the action instruction includes a waiting instruction that causes the vehicle controller to wait for entering the intersection, wherein the waiting instruction is transmitted to the vehicle controller of the first vehicle upon a determination that there are a predetermined number of the second vehicles currently occupying the intersection.

6. The method of claim 1, wherein the action instruction includes a waiting instruction that causes the vehicle controller to wait for entering the intersection, wherein the waiting instruction is transmitted to the vehicle controller of the first vehicle upon a determination that at least one of the second vehicles currently occupying the intersection belongs to a predetermined type.

7. The method of claim 1, wherein the action instruction includes a forbid-to-pass instruction to cause the first vehicle not to enter the intersection, wherein the forbid-to-pass instruction is transmitted to the vehicle controller of the first vehicle upon a determination that a predetermined moving direction of the first vehicle violates a traffic rule for the intersection or a determination that the intersection is under construction.

8. The method of claim 1, further comprising:
receiving a message transmitted from the vehicle controller when the first vehicle has passed and cleared the intersection; wherein the message indicates that the first vehicle has passed the intersection.

9. The method of claim 1, wherein the message is sent from the first vehicle when a distance between the first vehicle and the intersection is smaller than or equal to a predetermined distance, wherein the predetermined distance is determined based on a type of the first vehicle, a type of a road on which the vehicle is located, whether the first vehicle is an emergency rescue vehicle, whether the first vehicle is carrying hazardous chemicals.

10. A method of unmanned vehicle navigation, comprising:
transmitting, by a first vehicle, to an intersection controller, a message including a first identifier and a first moving direction of the first vehicle and an identifier of an intersection;
receiving, by the first vehicle, an action instruction transmitted from the intersection controller, including a determination by the intersection controller as to whether to allow the first vehicle to pass through the intersection based on an occupancy list for the intersection, wherein the occupancy list for the intersection is stored in the intersection controller and includes second identifiers and second moving directions of second vehicles that are previously allowed to pass through the intersection and have not cleared the intersection, wherein the second identifiers and second moving directions of at least one of the second vehicles are removed from the occupancy list upon a determination that the at least one of the second vehicles has passed and cleared the intersection, the first identifier and first moving direction of the first vehicle are written into the occupancy list upon the first vehicle being allowed to pass through the intersection, the first identifier and first moving direction of the first vehicle are removed from the occupancy list upon the first vehicle having passed and cleared the intersection; and
controlling movement of the first vehicle based on the action instruction.

11. The method of claim 10, wherein the transmitting to the intersection controller the message comprises:
transmitting to the intersection controller the message including a request of the first vehicle for passing through the intersection, when a distance between the first vehicle and the intersection is smaller than or equal to a predetermined distance, wherein the predetermined distance is determined based on a type of the first vehicle, a type of a road on which the vehicle is located, whether the first vehicle is an emergency rescue vehicle, whether the first vehicle is carrying hazardous chemicals.

12. The method of claim 10, wherein the action instruction includes an allow-to-pass instruction to cause the first vehicle to enter the intersection, wherein the allow-to-pass instruction is received from the intersection controller upon a determination that the first vehicle does not conflict with the second vehicles in the occupancy list.

13. The method of claim 10, wherein the action instruction includes a waiting instruction, wherein, upon receipt of the waiting instruction, the first vehicle waits for entering the intersection, wherein the waiting instruction is received from the intersection controller upon a determination that the intersection is occupied by at least one of the second vehicles and the second moving direction of at least one of the second vehicles in the occupancy list conflicts with the first moving direction of the first vehicle.

14. The method of claim 10, wherein the action instruction includes a waiting instruction, wherein, upon receipt of the waiting instruction, the first vehicle waits for entering the intersection, wherein the waiting instruction is received from the intersection controller upon a determination that there are a predetermined number of the second vehicles currently occupying the intersection.

15. The method of claim 10, wherein the action instruction includes a waiting instruction, wherein, upon receipt of the waiting instruction, the first vehicle waits for entering the intersection, wherein the waiting instruction is received from the intersection controller upon a determination that at least one of the second vehicles currently occupying the intersection belongs to a predetermined type.

16. A system, comprising a processor, a memory, and a computer program stored on the memory and executable by the processor, wherein the processor is configured to execute the computer program to perform a method of vehicle navigation, the method comprising:
receiving, by an intersection controller, a message of a first vehicle for passing through an intersection, the message including a first identifier and a first moving direction of the first vehicle and an identifier of the intersection;
determining, by the intersection controller, whether to allow the first vehicle to pass through the intersection based on an occupancy list for the intersection, wherein the occupancy list for the intersection is stored in the intersection controller and includes second identifiers and second moving directions of second vehicles that are previously allowed to pass through the intersection and have not cleared the intersection; and transmitting, by the intersection controller, an action instruction to a vehicle controller of the first vehicle to cause the first vehicle to control movement of the first vehicle based on the determining whether to allow the first vehicle to pass through the intersection;

writing, by the intersection controller, the first identifier and the first moving direction of the first vehicle into the occupancy list of the intersection, in response to determining to allow the first vehicle to pass through the intersection;

removing, by the intersection controller, the first identifier and the first moving direction of the first vehicle from the occupancy list of the intersection, in response to determining that the first vehicle has passed and cleared the intersection;

removing, by the intersection controller, the second identifiers and second moving directions of at least one of the second vehicles from the occupancy list upon a determination that the at least one of the second vehicles has passed and cleared the intersection.

17. The system of claim 16, wherein the action instruction includes an allow-to-pass instruction to cause the first vehicle to enter the intersection, wherein the allow-to-pass instruction is transmitted to the vehicle controller of the first vehicle upon a determination that the first vehicle does not conflict with the second vehicles in the occupancy list.

18. The system of claim 16, wherein the processor executes the computer program to transmit, to the vehicle controller of the first vehicle, as the action instruction, a waiting instruction that causes the vehicle controller to wait for entering the intersection, upon a determination that the intersection is occupied by at least one of the second vehicles and the second moving direction of at least one of the second vehicles in the occupancy list conflicts with the first moving direction of the first vehicle.

19. The system of claim 16, wherein the processor executes the computer program to transmit, to the vehicle controller of the first vehicle, as the action instruction, a waiting instruction that causes the vehicle controller to wait for entering the intersection, upon a determination that there are a predetermined number of the second vehicles currently occupying the intersection.

20. The system of claim 16, wherein the processor executes the computer program to transmit, to the vehicle controller of the first vehicle, as the action instruction, a waiting instruction that causes the vehicle controller to wait for entering the intersection, upon a determination that at least one of the second vehicles currently occupying the intersection belongs to a predetermined type.

* * * * *